(12) United States Patent
Abe et al.

(10) Patent No.: US 8,497,011 B2
(45) Date of Patent: Jul. 30, 2013

(54) DECORATIVE MATERIAL AND DECORATIVE SHEET

(75) Inventors: Kazuhiro Abe, Tokyo-to (JP); Takayuki Shibata, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 12/411,808

(22) Filed: Mar. 26, 2009

(65) Prior Publication Data

US 2010/0086742 A1  Apr. 8, 2010

Related U.S. Application Data

(62) Division of application No. 10/516,379, filed as application No. PCT/JP03/06739 on May 29, 2003, now abandoned.

(30) Foreign Application Priority Data

| May 30, 2002 | (JP) | 2002-157106 |
| Oct. 30, 2002 | (JP) | 2002-315809 |
| Nov. 19, 2002 | (JP) | 2002-334952 |

(51) Int. Cl.
- *B32B 3/00* (2006.01)
- *B32B 5/16* (2006.01)
- *D06N 7/04* (2006.01)

(52) U.S. Cl.
USPC ........... 428/156; 428/172; 428/323; 428/141; 428/143

(58) Field of Classification Search
USPC ............... 428/156, 172, 141, 143, 147, 203, 428/204, 323, 331, 206, 207, 328, 341, 339, 428/337
See application file for complete search history.

(56) References Cited

U.S. PATENT DOCUMENTS

| 6,103,352 | A | 8/2000 | Takahashi | |
| 6,329,041 | B1 * | 12/2001 | Tsuchiya et al. | 428/195.1 |
| 6,559,915 | B1 * | 5/2003 | Amimori et al. | 349/112 |
| 6,572,961 | B1 * | 6/2003 | Koyama et al. | 428/323 |
| 2002/0058147 | A1 * | 5/2002 | Taruishi | 428/447 |
| 2002/0075580 | A1 * | 6/2002 | Kubota | 359/885 |

FOREIGN PATENT DOCUMENTS

| EP | 1 038 665 A1 | 9/2000 |
| EP | 1 052 116 A2 | 11/2000 |
| JP | 53-064289 A | 6/1978 |
| JP | 04-117466 A | 4/1992 |

(Continued)

OTHER PUBLICATIONS

Database WPI Week 200058 Thompson Scientific, London, GB; AN 2000-604720; XP002596241—& JP 2000 211092 A (DaiNippon Printing Co Ltd) Aug. 2, 2000 abstract.

USPTO OA mailed Oct. 9, 2007 in connection with U.S. Appl. No. 10/516,379.

(Continued)

*Primary Examiner* — Catherine A Simone
(74) *Attorney, Agent, or Firm* — Ladas & Parry LLP

(57) ABSTRACT

Realization of a configuration of decorative sheet, particularly a decorative paper, or a decorative material in which it is adhered, meaning: a grain depression is not visible; excellent in scratch resistance, also in contamination resistance; and three-dimensional design can be expressed. The configuration is realized by using delustering silica, whose surface is treated with a fatty acid based wax such as stearic acid, in a decorative material 10 in which a luster adjusting resin layer 2, formed of a cross-linked cured material of an ionizing radiation curing resin composition containing a delustering silica, is on base material 1.

8 Claims, 4 Drawing Sheets

FOREIGN PATENT DOCUMENTS

| | | | |
|---|---|---|---|
| JP | 05-051549 | A | 3/1993 |
| JP | 06-220385 | A | 8/1994 |
| JP | 08-100397 | A | 4/1996 |
| JP | 08-244193 | A | 9/1996 |
| JP | 11-277685 | A | 10/1999 |
| JP | 2000-211092 | A | 8/2000 |
| JP | 2001-018331 | A | 1/2001 |
| JP | 2001-71424 | A | 3/2001 |
| WO | 00/03874 | A1 | 1/2000 |

OTHER PUBLICATIONS

USPTO OA mailed Dec. 12, 2007 in connection with U.S. Appl. No. 10/516,379.
USPTO OA mailed Sep. 29, 2008 in connection with U.S. Appl. No. 10/516,379.
European Search Report EP 03 73 3142.
International Search Report: PCT/JP03/06739.

* cited by examiner

DECORATIVE MATERIAL AND DECORATIVE SHEET

TECHNICAL FIELD

The present invention relates to: a decorative sheet wherein grain depression is not recognizable, excellent in scratch resistance and in contamination resistance, three-dimensional design can be expressed and a surface thereof can be delustered; and method for manufacturing the same. The present invention also relates to a decorative material whose surface strength such as abrasion resistance is imparted by an ionizing radiation curing resin layer, and also, whose surface is delustered by delustering silica.

BACKGROUND ART

Decorative sheets using paper and resin sheet, or decorative materials such as decorative material in the form of plate, in which the above-mentioned decorative sheet is adhered to an adhered base material, are used in various uses such as construction interior and exterior materials. These decorative sheets and decorative materials, in general, are often required to have surface strength such as scratch resistance and the like. For the above-mentioned reasons, for example, (1) ones, in which a curing resin layer of two-component curing resin, ionizing radiation curing resin, or the like is formed as an even thickness resin coated membrane (Japanese Patent Application Laid-Open (JP-A) No. 53-64289), is conventionally used for the surface of the decorative sheet. Comparing to two-component urethane resins and the like, such ionizing radiation curing resin has various advantages such as: excellent in productivity because instant curing is possible; solvent drying is not necessary and can be piled up; and further as result, relief printing in a pattern is possible.

Further, a decorative sheet, whose curing resin layer of the surface is formed into a convex-concave pattern, is proposed in the purpose of a convex-concave surface design, improving abrasion resistance or the like. For example, (2) a decorative sheet 20 having a configuration shown in cross-sectional view in FIG. 4, that on a pattern printed layer 22 provided on a base material 21, coating film layer 23 of an urethane based resin ink is provided on the entire surface, and further thereon, a convex-concave pattern 24 formed by the relief printing of the urethane base resin ink is provided (JP-A No. 8-100397). Or (3) a decorative sheet 20 having a configuration shown in cross-sectional view in FIG. 5, that on a pattern printed layer 22 provided on a base material 21, coating film layer 23 of an urethane based resin ink is provided on the entire surface, a convex-concave pattern 24 formed by the relief printing of the urethane base resin ink is provided thereon, and further on the entire surface of the convex-concave pattern 24, an overcoat layer 25 of a curing resin is provided (JP-A No. 8-244193).

On the other hand, various design expression is possible in forming of surface resin layers such as curing resin layer, using a doctor blade and a gravure plate (gravure coating, gravure printing), by adjusting a cell volume in order to make variation in thickness of the resin layer, or by forming in a pattern.

In the above-mentioned gravure coating or gravure printing, doctor streak may occur in long time operation. The doctor streak occurs when a tip of the doctor blade is chipped off, a groove shaped damage (doctor damage) occurs across the tip, so that the ink of this part is not scraped off sufficiently, because the doctor blade is not worn evenly in its width direction. Such doctor streak can be avoided if the doctor blade is changed earlier, or can be improved by using a steel doctor coated with ceramic (hereinafter, referred to as "ceramic doctor" for short) as the doctor blade instead of a conventional steel doctor blade.

The improvement of the doctor streak is attempted also in an aspect of compositions of the ink or coating liquid. For example, compositions containing an inorganic pigment (special light calcium carbonate) having rosette crystal (JP-A No. 5-51549), containing an amine salt of N-benzoyl amino alkane acid in an aqueous ink (JP-A No. 6-220385), or containing spherical filler such as a polycarbonate based resin and the like (JP-A No. 11-277685 (paragraph 0013)) are proposed.

However, particularly when the ink or coating liquid contain delustering agent such as delustering silica, the doctor streak is likely to occur. The delustering silica is used when a delustered surface (including a low-luster surface in addition to a delustered surface, as it is named) is required, for example, when luster on a surface of a decorative material is not wanted. Therefore, the resin layer on the surface is formed as a luster adjusting resin layer in which the delustering agent is added (Japanese Patent No. 2856862). Though there are various types of delustering agent, the delustering silica is most common in view of high delustering effect and low cost.

In the decorative sheet such as above-mentioned (1), in which a curing resin layer of an even thickness is formed by coating on the entire surface, abrasion resistance is improved by the curing resin layer. However, a problem of grain depression is likely to occur. The grain depression is a phenomenon that convex-concave, such as conduit or the like of the adhered base material surface, stands out on the surface of the decorative sheet when the decorative sheet is adhered to an adhered base material such as wooden substrate, such as a lauan plywood, a particle board and the like, to form a decorative material. Particularly, the phenomenon occurs when the decorative sheet is in a form of a decorative paper, a coated paper or the like, and the base material sheet is thin like a paper.

It was found that, in the decorative sheet provided with a convex-concave pattern by relief printing as the above-mentioned (2) and (3), not only the expression of the three-dimensional design, the grain depression can be made not visible by the convex-concave pattern, and further, scratch resistance can also be obtained. However, on the lower side of the convex-concave pattern 24 of the decorative sheet of (2), the coating film layer 23, of the curing resin, as same as the convex-concave pattern is provided. On the upper side of the convex-concave pattern 24 of the decorative sheet (3), the overcoat layer 25, of the curing resin, as same as the convex-concave pattern is provided. Therefore, the coating process of the coating film layer or the overcoat layer is necessary in addition to the relief printing of the convex-concave pattern so that high cost in processing and high material cost are inevitable.

In the viewpoint of the cost, a configuration of base material 21/pattern printed layer 22/convex-concave pattern 24, omitting the coating film layer or the overcoat layer, can be presented. However, with such configuration, sufficient property cannot be obtained in applications in which scratch resistance or contamination resistance is required. This is because, even though contamination resistance can be imparted to a convex part "a" of the convex-concave pattern 24 by forming the convex-concave pattern with curing resin, the lower layer of the convex-concave pattern, such as the pattern printed layer 22 or base material sheet 21, is bared in a concave part "b" of the convex-concave pattern in the relief printing. Therefore, contamination resistance of the decorative sheet is deteriorated as a whole, due to the poor contamination resistance of the lower layer (refer to FIG. 4).

On the other hand, when the delustering silica is added in order to adjust the luster of the surface, there is a problem that the doctor streak tends to occur. The tendency is apparent particularly when the curing resin layer on the surface is formed of the ionizing radiation curing resin, especially with no solvent. Further, in case of using the ionizing radiation curing resin by itself, the surface thereof tends to have a strong luster and it is difficult to weaken the luster. Therefore, the delustering agent must be added in the applications in which the strong luster is not wanted, so that improvement of the doctor streak and making the manufacturing easier are inevitable problems.

A reason that the addition of the delustering agent, when the resin is the ionizing radiation curing resin, has tendency to lead to the doctor streak is as follows. When a two-component curing type urethane resin and the like is diluted with a solvent and used, a lift up effect, wherein the delustering agent float up to the surface in volume shrinking of the coating film due to drying of the solvent, will contribute to the delustering. However, when no solvent is used, an adding amount or a particle diameter of the delustering agent is needed to be increased since there is no lift up effect. Moreover, when no solvent is used, a leveling effect after the coating is low so that the doctor streak tends to remain, being another reason. Although the doctor streak is improved by the use of the ceramic doctor, a difference by adding the delustering silica still remains.

DISCLOSURE OF THE INVENTION

An object of the present invention is to realize a configuration of decorative sheet, particularly a decorative paper and the like, or a decorative plate in which it is adhered, that is: a grain depression is not visible; excellent in scratch resistance, also in contamination resistance; and three-dimensional design can be expressed, at low cost.

Another object of the present invention is to improve the doctor streak in the above-mentioned decorative sheet, even when the delustering silica is added to adjust the luster of the surface.

Still other object of the present invention is to improve the doctor streak, in addition to the surface strength such as abrasion resistance, in decorative material provided with a luster adjusting resin layer of the ionizing radiation curing resin, in which the luster of the surface is weakened by the delustering silica.

For solving the above-mentioned problems, a decorative material of the present invention has a configuration that, a luster adjusting resin layer, which is formed of a cross-linked cured material of an ionizing radiation curing resin composition containing a delustering silica, is provided on a base material, and the delustering silica is a silica whose surface is treated with a fatty acid based wax.

With such configuration, even the luster adjusting resin layer contains the delustering silica as the delustering agent, the doctor streak, when the luster adjusting resin layer is formed, (by a gravure coating or gravure printing by using a doctor blade and a gravure plate) can be improved since the surface is treated with a fatty acid wax.

Moreover, for solving the above-mentioned problems, the decorative material of the present invention has a configuration that a luster adjusting resin layer, which is formed of a cross-linked cured material of an ionizing radiation curing resin composition containing a delustering silica, is provided on a base material, and the luster adjusting resin layer further contains either one or both of a magnesium hydroxide and a magnesium carbonate, as a filler.

With such configuration, even the luster adjusting resin layer contains the delustering silica as the delustering agent, the doctor streak when the luster adjusting resin layer is formed (by a gravure coating or gravure printing by using a doctor blade and a gravure plate) can be improved.

Moreover, the decorative material of the present invention has a configuration, further in the above-mentioned configuration, that the luster adjusting resin layer is formed partially, in a pattern, to form a convex-concave surface design of the luster adjusting resin layer.

With such configuration, design expression of a highly sophisticated design is possible by the convex-concave surface design. The luster adjusting resin layer having the convex-concave surface design can be formed with the relief printing by the gravure printing. In gravure printing, since a variation of the thickness can be formed as compared to a screen printing, highly sophisticated design can be expressed in the decorative material, also in this aspect. And the doctor streak can be improved in such design expression peculiar to the gravure printing.

Further in the method for manufacturing the decorative material of the present invention, the ionizing radiation curing resin composition is formed into the luster adjusting resin layer, with no solvent, by using a doctor blade and a gravure plate.

With such configuration of the method for manufacturing, even the luster adjusting resin layer of the decorative material contains the delustering silica as the delustering agent, the doctor streak when the luster adjusting resin layer is formed, by a gravure coating or gravure printing by using a doctor blade and a gravure plate, can be improved.

Moreover, for solving the above-mentioned problems, a decorative sheet of the present invention has a configuration that a convex pattern is formed on a base material sheet, the convex pattern is formed of a cross-link curing resin ink, and a non-printed part is covered with the ink flowed from a printed part by the ink to the non-printed part, so that the ink of the convex shape of the printed part is remained.

In such a configuration, by providing the curing resin layer, provided on the surface of the decorative sheet, as a convex pattern with the ink of the cross-link curing resin, not in an even thickness for the entire surface, damages on the surface can be prevented because stress on the surface, which is applied by other objects comes in contact with the decorative sheet surface, is dispersed by the convex pattern. In addition, even if the surface is damaged, the damage is not visible due to the convex pattern. Therefore, even when a normal cross-link curing resin is used, as compared to a conventional decorative sheet in which a flat resin coating film of an even thickness for the entire surface is formed, a decorative sheet excellent in scratch resistance can be obtained.

Further, the convex pattern is formed of the cross-link curing resin which is excellent in contamination resistance. Furthermore, the cross-link curing resin ink is flowed from the convex part to the concave part in between the convex parts so that the lower layer of the convex pattern is coated. Therefore, deterioration of contamination resistance of the decorative sheet as the whole surface, due to an exposure of the lower layer of an insufficient contamination resistance, dose not occur, and contamination resistance is improved. For the above-mentioned reasons, contamination resistance can be obtained even when the lower layer of the convex pattern is a decorative layer using resins of low contamination resistance such as thermoplastic resins or the like, or a base material sheet or the like having low contamination resistance.

Still more, there is no need to provide a coating film layer on the entire surface under the convex pattern, or provide overcoat layer on the entire surface on the convex pattern additionally to prevent the lower layer to be bared in the concave part. And the convex pattern in the present invention, whose concave part is also coated, can be formed as a single layer of continuous convex part and concave part by printing process of only one time. Therefore, contamination resistance can be realized with low process cost and with low material cost, since additional processes and additional materials for the coating film layer under the convex pattern or for the overcoat layer on the convex pattern are not necessary.

Moreover, the grain depression can be made not visible by the convex pattern on the decorative sheet surface even when the grain depression, due to the convex-concave standing out on the surface via the decorative sheet, occurs when the decorative sheet is adhered to the adhered base material.

Still more, three-dimensional design can be expressed by the convex pattern on the surface.

In the above-mentioned configuration, the decorative sheet of the present invention has a configuration that the cross-link curing resin comprises: a delustering silica for adjusting luster; and a fine particle silica whose average particle diameter is smaller than the delustering silica.

With the above-mentioned configuration, the flowing of the convex pattern can be obtained appropriately and certainly by adjusting a thixotropic property of the ink appropriately.

Moreover, in any one of the above-mentioned configuration, the decorative sheet of the present invention has a configuration that the cross-link curing resin is an ionizing radiation curing resin.

With the above-mentioned configuration, scratch resistance and contamination resistance can be improved surely.

In the above-mentioned configuration, the decorative sheet of the present invention has a configuration that the ionizing radiation curing resin contains an aluminum hydroxide.

With the above-mentioned configuration, scratch resistance can be improved more.

In the above-mentioned configuration, the decorative sheet of the present invention has a configuration that the ionizing radiation curing resin contains the delustering silica for adjusting luster, and further, contains either of a magnesium hydroxide and a magnesium carbonate, as a filler.

With such configuration, even the ionizing radiation curing resin constituting the convex pattern contains the delustering silica as the delustering agent, the doctor streak when the luster adjusted convex pattern is formed (by gravure printing by using a doctor blade and a gravure plate) can be improved.

Moreover, in any one of the above-mentioned configuration using the ionizing radiation curing resin, the decorative sheet of the present invention has a configuration that the ionizing radiation curing resin contains the delustering silica for adjusting luster, and the delustering silica is a silica whose surface is treated with a fatty acid based wax.

With such configuration, even the ionizing radiation curing resin constituting the convex pattern contains the delustering silica as the delustering agent, the doctor streak when the luster adjusted convex pattern is formed (by gravure printing by using a doctor blade and a gravure plate) can be improved since the surface of the delustering silica is treated with a fatty acid based wax.

Moreover, a method for manufacturing a decorative sheet of the present invention is a method that the convex pattern, which is formed of the ionizing radiation curing resin containing the delustering silica, is formed on the decorative sheet, and the ionizing radiation curing resin ink is formed into the convex pattern, with no solvent, by using a doctor blade and a gravure plate.

With such configuration of method for manufacturing, even the convex pattern of the decorative sheet contains the delustering silica as the delustering agent for adjusting the luster, the doctor streak, when the convex pattern is formed by gravure printing by using a doctor blade and a gravure plate, can be improved.

Still more, a decorative plate of the present invention has a configuration that any one of the above-mentioned decorative sheet is laminated on an adhered base material so that the base material sheet is faced to the adhered base material.

With such configuration, the above-mentioned effects of each decorative sheet used in each decorative plate can be obtained in each decorative plate. That is, the decorative plate has excellent scratch resistance, and also, has excellent contamination resistance. Further, contamination resistance can be realized with low processing cost and with low material cost. Furthermore, grain depression is not visible, and three-dimensional design can be expressed. Still more, if the cross-link curing resin of the convex pattern of the decorative sheet part is ionizing radiation curing resin, the scratch resistance and contamination resistance can be improved more assuringly. Moreover, the doctor streak when the luster adjusted convex pattern is formed (by gravure printing by using a doctor blade and a gravure plate) can be improved.

BEST MODE FOR CARRYING OUT THE INVENTION

The present invention relates to a decorative material, a method for manufacturing the same, a decorative sheet and a method for manufacturing the same. Hereinafter, the respective matters will be explained.

1. Decorative Material

[Summary]

Figure 1:
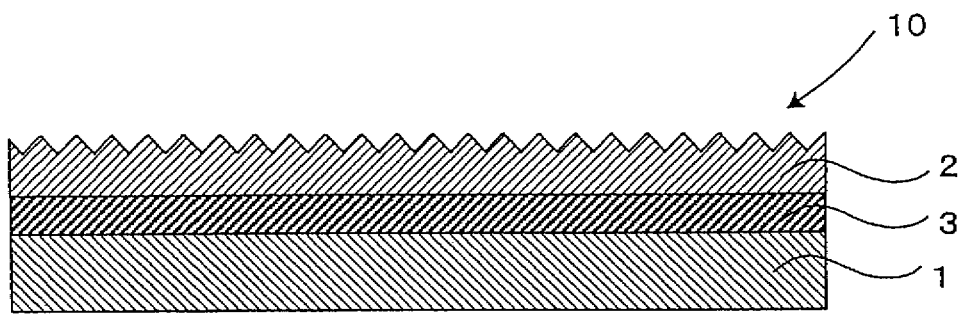
FIG. 1 is a cross sectional view showing one embodiment of a decorative material of the present invention.

FIG. 1 is a cross sectional view showing one embodiment of a decorative material 10 of the present invention. As shown in FIG. 1, the decorative material 10 of the present invention comprises at least: a base material 1; and a luster adjusting resin layer 2, formed thereon, which is formed of a cross-linked cured material of an ionizing radiation curing resin containing delustering silica. In a configuration of the first embodiment, for the delustering silica contained in the luster adjusting resin layer 2, delustering silica, whose surface is treated with fatty acid based wax, is used. And in a configuration of the second embodiment, the luster adjusting resin layer 2 further contains either one or both of magnesium hydroxide and magnesium carbonate, other than the delustering silica.

Additionally, as shown in the drawing, with respect to the decorative material 10, before the luster adjusting resin layer 2 is formed on the base material 1, a decorative layer 3 for expressing designs such as drawing patterns is generally formed by printing on the luster adjusting resin layer 2 side of the base material 1. Needless to say, the decorative layer 3 can be omitted depending on uses and the design expression. However, since better designs can be expressed, the layer is desirable to be formed. The base material 1 may be in the form of various shapes such as a sheet-like shaped, a plate-like shaped and the like. In the case of the sheet-like shaped, the decorative material is called as a decorative sheet or a decorative paper. And in the case of the plate-like shaped, it is called as decorative material.

Hereinafter, the respective embodiments will be explained separately.

(1) First Embodiment

At first, the first embodiment of the decorative material of the present invention will be explained. For example as shown in FIG. 1, the first embodiment of a decorative material of the present invention comprises at least: a base material 1; and a luster adjusting resin layer 2, formed thereon, which is formed of a cross-linked cured material of an ionizing radiation curing resin containing delustering silica, and for the delustering silica contained in the luster adjusting resin layer 2, the delustering silica, whose surface is treated with fatty acid based wax, is used.

Hereinafter, the respective components of the decorative material of this embodiment will be explained.

[Luster Adjusting Resin Layer]

At first, the luster adjusting resin layer 2 is a layer for providing surface physical properties such as abrasion resistance to the decorative material surface and adjusting the surface luster of the decorative material to lower the luster or to deluster. In this embodiment, the luster adjusting resin layer 2 is formed as a cross-linked cured material of an ionizing radiation curing resin composition containing at least an ionizing radiation curing resin and delustering silica whose surface is treated with fatty acid based wax. Use of the delustering silica, whose surface is treated with fatty acid based wax, as the delustering silica improves formation of doctor streaks although the delustering silica is contained. As the fatty acid based wax, for example, lauric acid, myristic acid, palmitic acid, stearic acid, behenic acid and the like may be used.

The doctor streaks are more lessened if the delustering silica particle diameter is smaller. However the delustering effect is also decreased. On the other hand, the delustering effect is more increased if the thickness of the luster adjusting resin layer is thinner, for the same particle diameter. Accordingly, the particle diameter of the delustering silica may be selected properly in consideration of the needed thickness of the luster adjusting resin layer and the required delustering degree.

For example, when the thickness of the luster adjusting resin layer (when the thickness is even, a high surface strength such as abrasion resistance can be obtained, and when the layer is formed in a pattern, sophisticated convex-concave surface designs can be obtained by relief printing) is 10 to 15 μm, in order to obtain the delustering effect, it is preferable to select delustering silica with an average particle diameter of 8 μm or larger. On the other hand, the maximum of the average particle diameter is about 15 μm in consideration of the doctor streak formation or the delustering effect. Consequently, in general, the particle diameter of the delustering silica is preferably about 8 to 15 μm. If it is smaller than the above range, sufficient delustering effect cannot be obtained, and if it is larger than the range, doctor streaks are easily formed (even if the delustering silica, whose surface is treated with fatty acid based wax, is used).

The as the adding amount of the delustering silica is smaller, the doctor streaks are less likely to be formed. However the delustering effect is also deteriorated. Therefore, in general, the adding amount is preferably about 5 to 20 parts by mass, more preferably 10 to 20 parts by mass, to 100 parts by mass of the resin component. If it is less than the above range, sufficient delustering effect cannot be obtained, and if it exceeds the above range, doctor streaks are easily formed (even if magnesium hydroxide is added).

In this embodiment, when the luster adjusting resin layer of the above configuration is formed by gravure coating or gravure printing method using a doctor blade and a gravure plate, even if ionizing radiation curing resin composition is used without a solvent as a material for the luster adjusting resin layer, the improving effect can be obtained. Therefore, since a thick luster adjusting resin layer can be easily formed, when the layer is formed on the entire face, the coating impression can be obtained easily. And when the layer is formed partially, a convex-concave surface design, formed by existence or absence of the luster adjusting resin layer formed partially in a pattern, can be expressed. In the latter case, it is formed by relief printing. If the relief printing is carried out by a screen printing, the thickness of the formed part becomes even. However, if carried out by using a gravure plate, the thickness of the formed part can be changed by cell volume variation of the plate. And thus, the convex-concave surface design highly sophisticated design expression is made possible. Additionally, even if the gravure coating (printing) on the entire surface, the thickness of the luster adjusting resin layer may be changed by cell volume variation, and in such a case, gradation expression of an image is made possible by coloring the luster adjusting resin layer.

As the ionizing radiation curing resin to be used for the ionizing radiation curing resin composition, conventionally known resins may be used properly depending on the uses.

As the ionizing radiation curing resin, specifically, compositions curable by ionizing radiation, which is obtained by mixing prepolymers (including so-called oligomers) and/or monomers having radical polymerizable unsaturated bonds or cationic polymerizable functional groups in molecules, are used preferably. The ionizing radiation means electromagnetic wave or charged particles having energy sufficient for cross-linking and curing molecules. And generally, ultraviolet (UV) or electron beam (EB) is used.

Specifically, the above-mentioned prepolymer or monomer formed of compounds comprising, in molecules, radical polymerizable unsaturated groups such as (meth)acryloyl group and (meth)acryloyloxy group, and cationic polymerizable functional groups such as epoxy group. Such prepolymers or monomers may be used alone or a plurality of types of these may be used in a combination. The (meth)acryloyl group means, for example, acryloyl group or methacryloyl group. As the ionizing radiation curing resin, polyene/thiol based prepolymers containing polyenes and polythiols in combination are also used preferably.

Examples for the prepolymers having the radical polymerizable unsaturated groups in molecules are polyester (meth)acrylate, urethane (meth)acrylate, epoxy (meth)acrylate, melamine (meth)acrylate, triazine (meth)acrylate, silicone (meth)acrylate and the like. Generally, those having a molecular weight about 250 to 100,000 are used.

Examples usable as the monomers having the radical polymerizable unsaturated groups in molecules are: mono-functional monomers such as methyl(meth)acrylate, 2-ethylhexyl (meth)acrylate, phenoxyethyl(meth)acrylate and the like; and polyfunctional monomers such as diethylene glycol (meth) acrylate, propylene glycol di(meth)acrylate, hexanediol (meth)acrylate, trimethylolpropane tri(meth)acrylate, trimethylolpropane ethylene oxide tri(meth)acrylate, pentaerythritol tetra(meth)acrylate, dipentaerythritol tetra (meth)acrylate, dipentaerythritol penta(meth)acrylate, dipentaerythritol hexa(meth)acrylate and the like.

Examples of the prepolymers having cationic polymerizable functional groups in molecules are prepolymers of: epoxy based resins such as bisphenol type epoxy resin, novolak type epoxy resin and the like; and vinyl ether based resins such as aliphatic based vinyl ethers, aromatic based vinyl ethers and the like.

Examples of the thoils are polythiols such as trimethylolpropane trithioglycolate, pentaerythritol tetrathioglycolate and the like. Also, for examples of polyenes, ones obtained by adding allylalcohol to both terminals of polyurethanes formed of diols and diisocyanates.

In the case of cross-linking and curing by UV or visible light rays, a photo-polymerization initiator is added to ionizing radiation curing resin. In the case of the resins having radical polymerizable unsaturated groups, as the photo-polymerization initiator, acetophenones, benzophenones, thioxanthones, benzoin, benzoin methyl ethers may be used alone or in form of mixtures. In the case of the resins having cationic polymerizable functional groups, as the photo-polymerization initiator, aromatic diazonium salts, aromatic sulfonium salts, aromatic iodonium salts, metallocene compounds, and benzoinsulfonic acid esters may be used alone or in form of mixtures.

The adding amount of these photo-polymerization initiators is about 0.1 to 10 parts by mass, to 100 parts by mass of the ionizing radiation curing resin.

With respect to a beam source of the ionizing radiation, as a UV source, an ultrahigh pressure mercury lamp, a high pressure mercury lamp, a low pressure mercury lamp, a carbon arc lamp, a black light type fluorescent lamp, a metal halide lamp and the like may be used. Generally, the wavelength of UV rays is mainly in a wavelength band of 190 to 380 nm.

As an electron beam source, a variety of electron accelerators such as Cockcroft-Walton type, Van de Graaff type, resonance transformer type, insulating core transformer type, linear type, dynamitron type, and high frequency type may be used. Those having electron beams with energy of 100 to 1,000 keV, preferably 100 to 300 keV are used. The radiation dose of the electron beam is generally about 20 to 150 kGy.

The luster adjusting resin layer of this embodiment is formed with the ionizing radiation curing resin composition containing the above ionizing radiation curing resin and at least delustering silica whose surface is treated with fatty acid based wax. However, as necessary, the ionizing radiation curing resin composition may further contain properly in purpose of physical property adjustment and the like, a thermoplastic resin and other known additives such as a filler, a dispersion stabilizer, a precipitation inhibitor, a coloring agent, a lubricant, an antistatic agent, and the like. For example, as the thermoplastic resin, vinyl chloride-vinyl acetate copolymer, vinyl acetate resin, acrylic resin, and cellulose based resin can be exemplified. As the filler, for example, aluminum hydroxide, talc, kaolin, calcium carbonate, magnesium hydroxide, magnesium carbonate and the like can be exemplified.

In addition, when the luster adjusting resin layer has a decorative layer beneath thereof, the layer is generally made transparent (including semi-transparent or transparent with a color) so as to make the decorative layer visible. However, an opaque layer (colored or un-colored) is formed in some cases.

With respect to the ionizing radiation curing resin composition, it is preferable to use without a solvent since there is no need to dry or carry out post treatment for a solvent and it is free from a problem of remaining solvent. However for physical property adjustment, a solvent may be added. From the above viewpoint, it is preferable to suppress the amount of the solvent as much as possible and it is preferably 20 parts by mass or less, to 100 parts by mass of the resin component. The doctor streak improving effect in this embodiment is more effective when the solvent content is as low as to be in the above range.

The luster adjusting resin layer is formed with the ionizing radiation curing resin composition as explained above (that is, the ionizing radiation curing resin composition containing at least the ionizing radiation curing resin and the delustering silica whose surface is treated with fatty acid based wax), preferably with a non-solvent composition, by using a doctor blade and a gravure plate. In a case of forming partially or in a case of forming on the entire surface with thickness variation, gravure printing is employed, and in a case of forming on the entire face with an even thickness, gravure coating is employed.

The thickness of the luster adjusting resin layer is not particularly limited that it may be an appropriate thickness depending on the required physical properties such as surface strength and designs (coating impression, transparent feeling, and convex-concave surface designs). However, for example, it is about 1 to 50 µm and generally about 2 to 30 µm. In the case of the luster adjusting resin layer using the ionizing radiation curing resin, there is an advantage that the thickness can be easily made thicker. And from this viewpoint, the thickness is 10 µm or thicker. Further, with such a thick thickness, the doctor streak improving effect of this embodiment becomes more efficient.

[Base Material]

Next, as the base material 1, various base materials conventionally known as a base materials for the decorative material may be used depending on uses without any particular limit on the shapes, material, and other properties of the base materials and for example, sheets of such as paper and resins, plates, and cubic materials may be used.

The material of the base material may be paper based, wood based, metal based, inorganic non-metal based (ceramic based, non-pottery ceramic industry based), and resin based. Both ink-permeable ones (e.g. paper and nonwoven fabrics) and ink-impermeable ones (resin sheets) may be used. Among them, paper and resin sheets (films) are typical examples and if they are used as the base material, the decorative material of this embodiment becomes a decorative sheet.

As a fibrous base material other than paper based one, nonwoven fabrics made of fibers such as polyester resin, acrylic resin, nylon, vinylon, and glass may be used. Similarly to the case of the above paper based ones, the nonwoven fabrics may contain resin (by resin impregnation after production or filling with resin during production) such as acrylic resin, styrene-butadiene rubber, melamine resin, and urethane resin.

As the resin based base material, examples of usable resin materials are: polyolefin based resins such as polyethylene, polypropylene, and an olefin based thermoplastic elastomer; vinyl based resins such as vinyl chloride resin, vinylidene chloride resin, and ethylene-vinyl alcohol copolymer; polyester resins such as polyethylene terephthalate and polybutylene terephthalate; acrylic resins; polystyrene; acrylonitrilebutadiene-styrene copolymer (ABS resins); cellulose triacetate; cellophane; and polycarbonate. These resins may be used in form of sheets, plates, and cubic products.

The resin based base material may further include thermosetting resin plates formed of thermosetting resins such as phenol resin, urea resin, unsaturated polyester resin, urethane resin, epoxy resin, and melamine resin; and resin plates such as composite plates so-called FRP (fiber-reinforced plastic) plates obtained by impregnating glass fiber nonwoven fabrics, cloths, paper, and other fibrous material with resins such as phenol resin, urea resin, unsaturated polyester resin, urethane resin, epoxy resin, melamine resin, and diallyl phthalate resin and curing the resins.

As the wood based base material, examples of usable wood materials are veneers, laminates, particle boards, fiber boards, glued lamination boards of such as Japanese cedar, Japanese cypress, oak, lauan, and teak. These wood based base materials may be used in form of sheets, plates, and cubic products.

As the metal based base material, examples of usable metal materials are iron, aluminum, stainless steel, and copper. These metal based base materials may be used in form of sheets (foils), plates, and cubic products.

As the inorganic non-metal based base material, examples of usable materials are: non-pottery ceramic industry based materials such as extrusion cement, slag cement, ALC (autoclaved lightweight concrete), GRC (glass fiber-reinforced concrete), pulp cement, wood cement, asbestos cement, calcium silicate, gypsum, and gypsum slag; and ceramic based materials such as pottery, earthenware, whiteware, stoneware, glass, and enamel. The nonmetal based base materials are mainly used in form of plates and cubic products.

The base material to be used may also include composite base materials obtained by laminating and compounding two or more of the above various materials by known means such as adhesives, thermal fusion and the like. The resin-impregnated paper and FRP are examples of them.

The decorative material of this embodiment further include those obtained by producing a decorative material in the form of a decorative sheet using a sheet-like shaped base material, and then, laminating the decorative sheet on another base material (a sheet, a plate, or a cubic product) by using an additive or the like and such a base material of the decorative material is one example of the laminates of two or more materials.

Other properties of the base material mean, for example, ink-permeability. Base material having no ink-permeability are resin sheets of vinyl chloride resin, polyethylene terephthalate, and polyolefin type resin. And base materials having ink-permeability are paper materials such as pure white paper for printing, reinforced paper, impregnated paper impregnated with curing resin; and other fibrous base materials of textiles and nonwoven fabrics.

In a case of using the base materials having ink-permeability, if the permeability leads to a problem, it is preferable to form a known sealing resin layer (sealer layer) previously on the base materials. Acrylic resin and urethane resin may be used for the sealing resin layer. Also, among the below mentioned decorative layer, a layer formed on the entire surface may be provided with a sealing function as well.

The thickness of the base materials differs depending on the shape, the material, and uses. For example, in the case of a fibrous base material like paper based ones, it is generally about 50 to 150 g/m² based on basic weight, and about 50 to 300 μm thickness.

[Decorative Layer]

If the decorative layer 3 is provided, a decorative material with higher design property can be obtained by expressing drawings and patterns with the layer. In this case, the position for forming the decorative layer is beneath the luster adjusting resin layer, more preferably in between the luster adjusting resin layer and the base material, in terms of the durability such as abrasion resistance for the decorative layer.

The decorative layer 3 may be formed as a layer in which drawings and patterns are expressed by conventionally known printing methods such as gravure printing, silk screen printing, off-set printing, gravure off-set printing, ink-jet printing and the like or a coating method by using an ink (or a pain). Examples of the drawings and patterns may include wood grain patterns, stone grain patterns, sand patterns, pear-skin patterns, fabric patterns, tile-like patterns, brick-like patterns, tie-dyed patterns, letters, geometric patterns, solid pattern for the entire surface or combination of two or more of these patterns. In the case of the solid pattern for the entire surface, it may be formed by known coating methods such as roll coating and gravure coating.

Just like a common ink (or a paint), ink (or a paint) to be used for forming the decorative layer comprised a vehicle such as a binder, a coloring agent such as a pigment and a dye, and various types of additives to be added appropriately. As the binder resin, for example: cellulose type resins such as nitrocellulose, cellulose acetate, and cellulose acetate propionate; urethane resin; acrylic resin; vinyl chloride-vinyl acetate copolymer; polyester resin; alkyd resin and the like may be used alone or in form of mixtures containing them. As the coloring agent, for example: inorganic pigments such as titanium white, zinc flower, carbon black, iron black, red iron oxide, cadmium red, chrome yellow, titanium yellow, cobalt blue, and ultramarine; organic pigments such as aniline black, quinacridone red, polyazo red, isoindolinone yellow, benzidine yellow, phthalocyanine blue and indanthrene blue; bright pigments such as titanium dioxide-coated mica, shell, brass, flaky foil powder of aluminum or the like; or other dyes may be used.

In the case of the solid pattern for the entire surface, by adding a pigment with high screening property, such as titanium white, carbon black (Chinese ink) and metal foil powder pigments, as the coloring agent provides the decorative layer with a function as a sealing layer for sealing the color tone of an adhered material.

[Other Layers]

Based on necessity, layers other than the above luster adjusting resin layer, base material, and decorative layer may be formed. Examples of the layers are: a sealer layer for suppressing penetration of the base material, when the base material is made of penetrating material such as paper; and a primer layer for reinforcing the adhesion between layers. The sealer layer and the primer layer may be formed using conventionally known materials by conventionally known methods in the decorative material. For example, the layers may be formed using ink or a coating material of resins such as acrylic resin and urethane resin by a printing method such as gravure printing or a coating method such as roll coating.

[Uses]

The decorative material of this embodiment may be used without any particular limitation. For example it can be used for: furniture such as drawers, cabinets, desks, and tables; interior materials for constructions such as floors, walls, and ceilings; fixtures such as doors, door flames, window flames; structural members such as corridors and baseboards.

(2) Second Embodiment

Next, the second embodiment of a decorative material of the present invention will be explained. As shown in FIG. 1, the second embodiment of a decorative material of the present invention comprises at least a base material 1 and a luster adjusting resin layer 2, formed thereon, which is formed of a cross-linked cured material of an ionizing radiation curing resin containing delustering silica, and the luster adjusting resin layer 2 further contains either of both of magnesium hydroxide and magnesium carbonate, in addition to the delustering silica.

Hereinafter, the respective components of the decorative material of this embodiment will be explained.

[Luster Adjusting Resin Layer]

At first, the luster adjusting resin layer 2 is a layer for providing surface physical properties such as abrasion resistance to the decorative material surface and for adjusting the surface luster of the decorative material to lower the luster or to deluster the surface. In this embodiment, the luster adjusting resin layer 2 is formed as a cross-linked cured material of an ionizing radiation curing resin composition containing at least an ionizing radiation curing resin, delustering silica, and further, magnesium hydroxide and/or magnesium carbonate. By containing the magnesium hydroxide, magnesium carbonate, or both of them as indispensable fillers, in addition to the delustering silica, improves doctor streak generation even though the delustering silica is contained therein.

As the delustering silica, conventionally known silica for delustering may be used properly depending on the uses. The doctor streaks are more lessened if the delustering silica particle diameter is smaller. However the delustering effect is also decreased. On the other hand, the delustering effect is more increased if the thickness of the luster adjusting resin layer is thinner, for the same particle diameter. Accordingly, the particle diameter of the delustering silica may be selected properly in consideration of the required thickness of the luster adjusting resin layer and the required delustering degree.

For example, when the thickness of the luster adjusting resin layer (if the thickness is even, a high surface strength such as abrasion resistance can be obtained, and in the case of forming the layer in a pattern, sophisticated convex-concave surface designs can be obtained by relief printing) is 10 to 15 μm, in order to obtain the delustering effect, it is preferable to select delustering silica with an average particle diameter of 8 μm or larger. On the other hand, the maximum of the average particle diameter is about 15 μm in consideration of the doctor streak formation or the delustering effect. Consequently, in general, the particle diameter of the delustering silica is preferably about 8 to 15 μm. If it is smaller than the above range, sufficient delustering effect cannot be obtained, and if it is larger than the range, doctor streaks are more likely to be formed (even if magnesium hydroxide and magnesium carbonate are contained).

The doctor streaks are less likely to be formed as the adding amount of the delustering silica is smaller. However the delustering effect is also deteriorated. Therefore, in general, the adding amount is preferably about 5 to 20 parts by mass, more preferably about 10 to 20 parts by mass, to 100 parts by mass of the resin component. If it is less than the above range, sufficient delustering effect cannot be obtained, and if it exceeds the range, doctor streaks are more likely to be formed (even in the case of containing magnesium hydroxide or the like).

Magnesium hydroxide and magnesium carbonate (hereinafter, they may be named generally as magnesium compound) to be contained as fillers: have refractive indexes close to that of a resin; is able to assure the transparency of the luster adjusting resin layer; and also give good doctor streak improving effect among various kinds of fillers, which have soft hardness to the doctor blades (Morse hardness 4 or 3 or lower). For example, in the case of talc as softer as Morse hardness 1, doctor streak improving effect cannot be obtained. And even in the case of aluminum hydroxide having similar hardness of Morse hardness 3, doctor streak improving effect cannot be obtained.

Although the particle shape of these magnesium compounds subjected to the tests is amorphous, and thus, is not spherical as described above (Japanese Patent Application Laid-Open No. 11-277685), the doctor streak improving effect is obtained.

As compared with magnesium hydroxide, magnesium carbonate is weaker in coloring contamination (coloring contamination resistance) as contamination resistance and easy to be colored and dyed, in such a case, magnesium hydroxide is preferable. Also, magnesium hydroxide and magnesium carbonate may be used independently or in combination with each other. Additionally, magnesium carbonate to be added as the filler in this embodiment is so-called magnesium carbonate and more accurately, it is basic magnesium carbonate.

The adding amount of the above magnesium compounds is 1 to 15 parts by mass, more preferably 1 to 10 parts by mass, to 100 parts by mass of the resin component. If it is less than the range, the sufficient improving effect cannot be obtained, and if it exceeds the range, the doctor stream improving effect is deteriorated. Additionally, the delustering effect of these magnesium compounds themselves (as compared with the delustering silica) is low. If they are added in a high content so as to obtain the delustering effect only by these magnesium compounds without the delustering silica, for example 40 parts by mass of magnesium hydroxide is added, the doctor streaks are worsened more than those in the case of using the delustering silica alone.

The particle diameter of the above magnesium compounds is preferably 10 μm or less at maximum as the average particle diameter in terms of the doctor streak improvement.

As described, use of magnesium hydroxide and magnesium carbonate in combination with delustering silica improves the doctor streaks which are likely to be generated due to the use of delustering silica, when the luster adjusting resin layer is formed by a gravure coating or gravure printing method using a doctor blade and a gravure plate. Although the effect can be obtained by using a conventional doctor blade made of steel, as the doctor blade, a ceramic doctor is preferable in terms of the durability and less doctor streak formation.

In this embodiment, when the luster adjusting resin layer is formed by the gravure coating or gravure printing method using a doctor blade and a gravure plate, even if ionizing radiation curing resin composition is used without a solvent as a material for the luster adjusting resin layer, the improving effect can be achieved. Therefore, since the luster adjusting resin layer is easily formed to be thick, when the layer is formed on the entire face, the coating impression can be obtained easily. Moreover, when the layer is formed partially, the convex-concave surface design due to the existence and absence of the luster adjusting resin layer, formed partially in a pattern, can be expressed. In the latter case, it is formed by the relief printing. If the relief printing is carried out by screen printing, the thickness of the formed part becomes even. Meanwhile by using a gravure plate, the thickness of the formed part can be changed by cell volume variation of the plate, and thus, the convex-concave surface design with higher designing expression is made possible. Additionally, in the case of the gravure coating (printing) on the entire surface, the thickness of the luster adjusting resin layer may be changed by cell volume variation, and in such a case, gradation expression of an image is made possible by coloring the luster adjusting resin layer.

As the ionizing radiation curing resin to be used for the ionizing radiation curing resin composition, conventionally known resins may be used properly depending on the uses and those same as explained in the first embodiment may be used. The beam sources of the ionizing radiation beams to be used are also same as those explained in the first embodiment. Therefore, further explanation is not repeated here.

The luster adjusting resin layer of this embodiment is formed with ionizing radiation curing resin composition containing the above ionizing radiation curing resin, at least delustering silica, and further, as fillers, magnesium hydroxide and/or magnesium carbonate. For physical property adjustment, properly as necessary, the ionizing radiation curing resin composition may further contain: a thermoplastic resin such as vinyl chloride-vinyl acetate copolymer, vinyl acetate resin, acrylic resin, and cellulose based resin; and other known additives, for example, a dispersion stabilizer, a precipitation inhibitor, a coloring agent, a lubricant, an antistatic agent, and the like.

In addition, when the luster adjusting resin layer has a decorative layer beneath thereof, the layer is generally made transparent (including semi-transparent or transparent with a color) so as to make the decorative layer visible. However an opaque layer (colored or un-colored) may be formed in some cases.

With respect to the ionizing radiation curing resin composition, it is preferable to use the composition without a solvent since there is no need to dry or carry out post treatment for a solvent and it is free from a problem of remaining solvent. However for physical property adjustment, a solvent may be added. From the above viewpoint, it is preferable to suppress the amount of the solvent as much as possible and it is preferably 20 parts by mass or less, to 100 parts by mass of the resin component. The doctor streak improving effect in this embodiment can be more effective when the solvent content is so low as to be in the above range.

The luster adjusting resin layer is formed with the above mentioned ionizing radiation curing resin composition, preferably with a non-solvent composition, by using a doctor blade and a gravure plate. When the layer is formed partially or the layer is formed on the entire surface with thickness variation, gravure printing is employed. And the layer is formed on the entire surface with an even thickness, gravure coating is employed.

The thickness of the luster adjusting resin layer is not particularly limited and may be a proper thickness depending on the required physical properties such as surface strength and designs (coating impression, transparent feeling, and convex-concave surface designs). However, it is about 5 to 50 μm and generally about 10 to 30 μm. In the case of the luster adjusting resin layer using the ionizing radiation curing resin, it is advantageous that the thickness is easily made thicker, and from this viewpoint, the thickness is 10 μm or thicker. Further, with such a thick thickness, the doctor streak improving effect of this embodiment becomes more efficient.

[Base Material]

Next, as the base material 1, various base materials conventionally known as base materials for the decorative material may be used depending on uses without any particular limitation on shapes, material and other properties of the base materials. For example, sheets of such as paper and resins, plates, and cubic materials may be used and those same as explained in the first embodiment can be used. Therefore, the explanation is not repeated here.

[Decorative Layer]

If the decorative layer 3 is provided, a decorative material with higher design property can be obtained by expressing drawings and patterns on the layer. In this case, the position of providing the decorative layer is preferably beneath the luster adjusting resin layer, more preferably in between the luster adjusting resin layer and the base material, in terms of the durability such as abrasion resistance of the decorative layer. The decorative layer is also same as that explained in the first embodiment. Therefore further explanation is not repeated here.

[Other Layers]

Based on necessity, layers other than the above luster adjusting resin layer, base material, and decorative layer may be provided. Examples of the layers are a sealer layer, which suppresses base material penetration when the base material is made of paper, and a primer layer, which reinforces the adhesion between layers. The sealer layer and the primer layer may be formed using conventionally known materials by conventionally known methods in the decorative material. For example, the layers may be formed with an ink or a paint using resins such as acrylic resin and urethane resin by a printing method such as gravure printing or a coating method such as roll coating.

[Uses]

The decorative material of this embodiment may be used without any particular limitations. For example, it can be used for: furniture such as drawers, cabinets, desks, and tables; interior materials for constructions such as floors, walls, and ceilings; fixtures such as doors, door flames, window flames; structural members such as corridors and baseboards.

2. Decorative Sheet

Next, a decorative sheet of the present invention and a decorative plate obtained by laminating the decorative sheet an adhered base material will be explained.

[Summary]

Figure 3A:
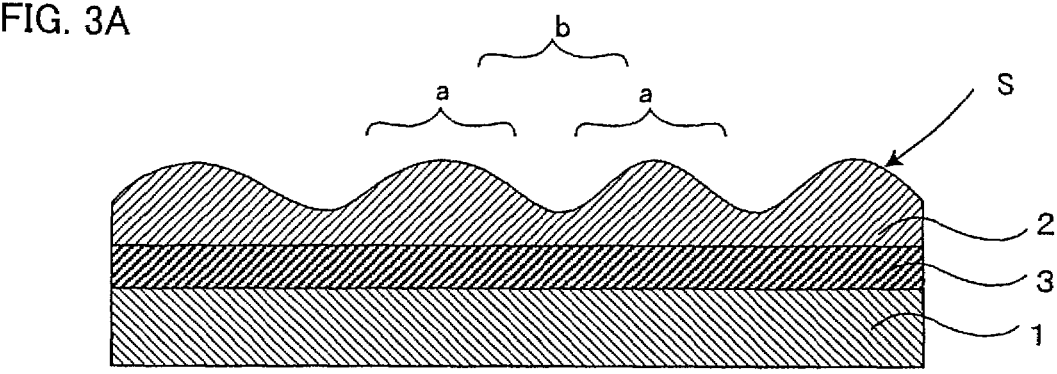
FIGS. 3A to 3D are cross sectional views showing one embodiment of a decorative sheet and a decorative material of the present invention and for schematically illustrating a convex pattern.
Figure 3B:
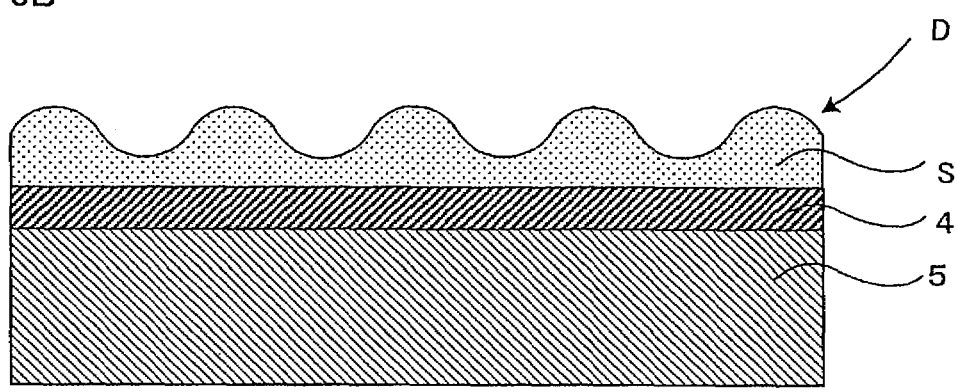
Figure 3C:
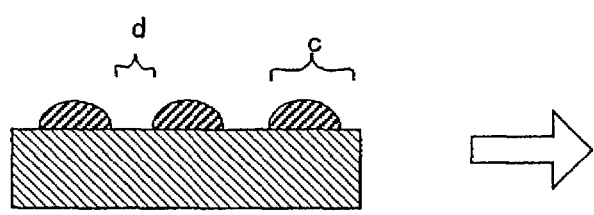
Figure 3D:
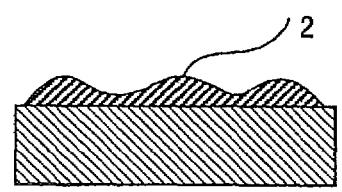
Figure 4:
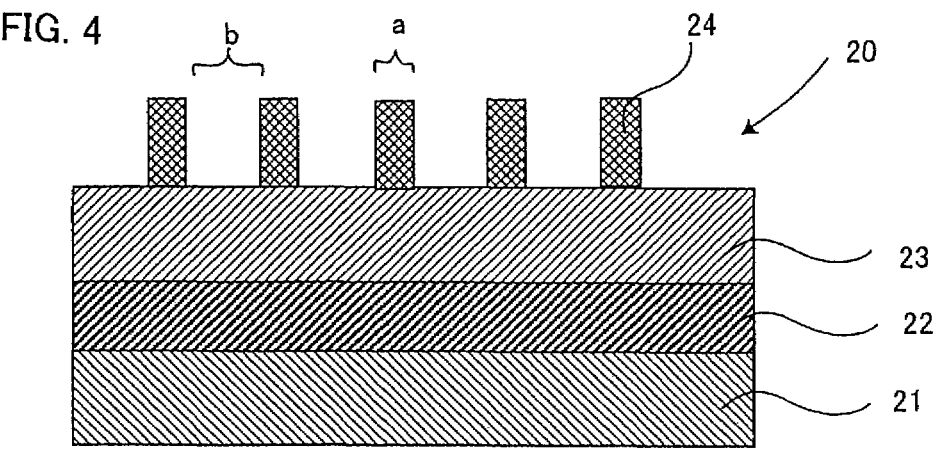
FIG. 4 is a cross sectional view showing one embodiment of a conventional decorative sheet.
Figure 5:
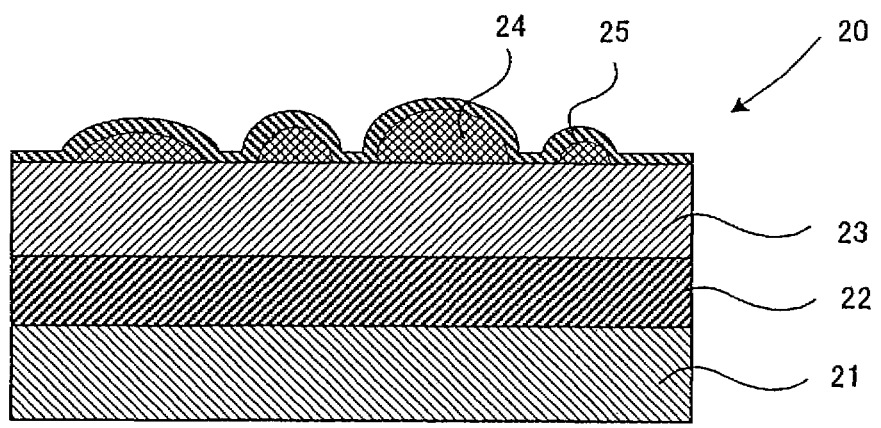
FIG. 5 is a cross sectional view showing another embodiment of a conventional decorative sheet.

FIGS. 3A to 3D show cross sectional views of a decorative sheet S, a decorative plate D, and convex patterns 2 formed on them. FIG. 3A is a cross sectional view showing one embodiment of the decorative sheet S; FIG. 3B is a cross sectional view showing one embodiment of the decorative plate D; and FIG. 3C and FIG. 3D are cross sectional views schematically showing cross sectional shapes of the convex patterns 2, before and after forming the convex patterns 2.

As shown in FIG. 3A, the decorative sheet S of the present invention is a decorative sheet, wherein at least a convex pattern 2, peculiar to the present invention as mentioned above, is formed on the surface of the decorative sheet on a base material 1. Generally, as shown in FIG. 3A, before forming the convex patterns 2 on the base material 1, a decorative layer 3 of a pattern printed layer or the like, for design expression such as drawings and patterns, is formed by printing on the convex pattern 2 side of the base material sheet 1. Therefore, generally, the decorative layer 3 is provided in between the base material sheet 1 and the convex pattern 2. Needless to say, depending on the design expression, the decorative layer 3 may be omitted.

When an ionizing radiation curing resin is used for a crosslink curing resin for the convex patterns, and when it also contains delustering silica for adjustment, it is preferable that the magnesium hydroxide and the like is further contained, as a filler, or that the silica whose surface is treated with a fatty acid type is used as the delustering silica. It is because when the convex patterns are formed with a non-solvent ink, by gravure printing using a doctor blade and a gravure plate, the doctor streak generation can be improved.

By adhering such the decorative sheet S to an adhered base material 5 with a proper adhesive layer 4, the decorative plate D as exemplified in FIG. 3B can be obtained. In the decorative plate D shown in FIG. 3B, only the convex pattern 2, peculiar to the present invention, formed on its surface side is shown as the decorative sheet S part, and the decorative sheet layer configuration is omitted. The layer configuration is, for example, as that shown in FIG. 3A and it may be properly changed depending on the uses.

Hereinafter, the present invention will be explained in details at first concerning the convex pattern.

[Convex Pattern]

At first, the convex pattern 2 is formed by using ink of cross-link curing resin. As shown in FIG. 3C and FIG. 3D, it is formed as the convex patterns 2 at least a part of a non-printed part, preferably the entire surface, is covered with the ink of the printed part flowed from a printed part "c" to a non-printed part "d". The ink is flowed so that the printed part, which is convex to the non-printed part, will remain, and that the printed part and the non-printed part are not flattened without height variation. No need to say, the ink of the cross-link curing resin is cross-linked and cured to be a cross-linked cured material on the decorative sheet.

Different from convex-concave patterns 24 by simple relief printing as explained in the paragraph of Background Art, in the convex pattern 2 of the present invention, the lower layer beneath the convex pattern 2 (in the case of FIG. 3A, the decorative layer 3) is covered, even in the concave "b" in between convexes "a", by the ink flowed from the convex parts. The above-mentioned convex parts "a" are derived from the printed parts "c" and the concave parts "b" are derived from the non-printed parts "d". Therefore, in the present invention, to the printed parts "c" which are the parts where the ink is transferred from a printing plate, after the ink transfer, the ink in the printed parts "c" is fluidized and spread even to the non-printed parts "d" so that at least a part of the non-printed part is covered with the ink. However, if the entire surface including the printed parts and the non-printed parts becomes a flat surface and the convex-concave of the printing is eliminated by flowing the ink to the non-printed parts, the surface will merely be a coating film with an even thickness, being meaningless. Accordingly, the ink is flowed to the extent that the convex shapes of the printed parts will remain to form the convex pattern. Of course, although the convex shapes of the printed parts remain, the shape of the convex in the printed parts dose not remain as keeping the same cross sectional shape immediately after the printing. Since the ink covering the printed parts is decreased by the amount corresponding to the amount of the ink fluidized from the printed parts to the non-printed parts, the height of the convex shape in the printed parts is lowered to that extent, and the hill shape of the convex part becomes dull. However, the convex shape itself basically remains in the printed parts.

In the convex pattern in the present invention, the concave part deriving from the non-printed part is covered with the ink flowed from the printed parts. Concerning an extent of the coverage, it is acceptable that at least a part of the non-printed part is covered, since contamination resistance improving effect can be obtained correspondingly. No need to say, it is more preferable that a wider area is completely covered. It is most preferable that the entire surface of the non-printed part is completely covered.

In terms of the apparent complete cover, there is a means of, after overprinting solid pattern for the entire surface for two times (colors) by gravure printing of the same cross-link curing resin ink, forming the convex pattern by printing a convex pattern, thereby constituting the part which is not covered with the same cross-link curing resin. However by such means, it requires increased number of processes and results in high cost. Accordingly, in terms of prevention of process increase and increasing the cost, it is preferable to form the convex patterns by one time (color) printing to form a single layer with the convex pattern of the continuous convex parts and the concave parts.

In such a manner, to flow the ink to the non-printed parts to the extent that the convex shape of the printed parts remains, it is preferable that the ink transfer amount to the printed parts (the height of the printed parts and the area ratio of them) and the ink fluidity (the viscosity and the thixotropic property) are adjusted properly.

If the ink transfer amount to the printed parts is made high, the non-printed parts are easily covered with the ink from the printed parts. The ink transfer amount may be adjusted by the plate depth in the case of gravure printing. If the ink transfer amount is adjusted to be 4 $g/m^2$ or more, on the basis of the dry coating amount, good results can easily obtained, although it depends on the conditions.

On the other hand, if the viscosity is too high, the non-printed parts cannot be covered sufficiently with the ink from the printed parts, and on the contrary, if it is too low, the convex shape of the printed parts cannot be retained.

Also, if the thixotropic property is extremely high, the ink is not at all or scarcely flowed to the non-printed parts from the printed parts. Accordingly, in this case, the non-printed parts cannot be covered with the ink from the printed parts sufficiently. On the other hand, if the thixotropic property is extremely low, the ink is smoothly flowed to the non-printed parts from the printed parts, and the surface is leveled to be flat or almost flat. Accordingly, in this case, a coating film with an even thickness for the entire surface is formed. Therefore, the thixotropic property of the ink is adjusted to be proper, neither too high nor too low. However, the degree of the preferable thixotropic property depends on the pattern shape (the thickness, the ink transfer amount, the width and the like) of the printed parts and the patterns in the non-printed parts. If the non-printed parts are wider, the flow of the ink to the non-printed parts from the printed parts has to reach a wide range (long distance), and therefore, the thixotropic property is better to be low.

However, since preferable viscosity and thixotropic property depend on the plane pattern shape and the height of the convex pattern to be formed, they cannot be generalized. For example, the preferable viscosity and thixotropic property will change depending on the desired convex-concave surface design impression, pattern shape of the convex patterns according to it, the surface delustering design impression required for the convex patterns themselves, existence and the adding amount of a delustering agent, ink-permeability of the lower layer of the convex patterns and its extent, and required scratch resistance and contamination resistance. Therefore, specifically, in consideration of these properties, the ink composition is assigned, and by observing the ink flow extent on the surface with a microscope, conditions leading to good contamination resistance may be found.

Specific examples for viscosity and thixotropic property are given below. According to measurement by an E type rotary viscometer, (apparent) viscosity is about 500 to 1,000 mPa·s (rotation speed 50 rmp; temperature at 35° C.). With respect to the thixotropic property, the thixotropic index value (TI value) is around 1.5. The thixotropic index value (TI value) is as the ratio of the viscosity at the rotation speed of 5 rpm to the viscosity at the rotation speed of 50 rpm. The viscosity measuring temperature corresponds to the actual temperature of the ink at the time of printing, and the actual temperature at the time of printing may be adjusted properly by cooling or heating. The temperature is not limited to the above temperature.

The convex-concave pattern by conventional relief printing is formed concerning not to deteriorate the height of the convex part by maintaining the relief shape of the convex part, formed as the printed part, as much as possible. Therefore, in the case of the conventional relief printing, the thixotropic property is better to be as high as possible. On the other hand, the present invention is based on a different concept from that of the conventional relief printing. Unlike the conventional relief printing, ink is intentionally flowed in order to form the convex pattern. That is thoroughly out of the idea of conventional relief printing, and thus, the present invention is accomplished based on the finding of advantageous effects in the field which are out of the conceptual range of the conventional relief printing.

The viscosity and thixotropic property of the ink can be adjusted properly by: binder resin (cross-link curing resin) of the ink; inorganic fillers such as a fine powder silica as a thixotropic agent; inorganic fillers such as silica, alumina, kaolin, and calcium carbonate; organic fillers such as resin beads; use or not of a diluting solvent; their adding amounts; and the temperature at the time of ink printing (and until the ink is cured). It is also effective to add two types of fillers with different average particle diameter at the time of addition of the filler. Specifically: fine particle silica powder with an average particle diameter of nm order is used in combination with a delustering silica powder with an average particle diameter around 5 to 20 μm; or a filler with a smaller average particle diameter is used in combination with a filler with a larger average particle diameter. Also, paying attention to the particle size distribution other than the average particle diameter, proper flow ability may be obtained.

Figure 2:
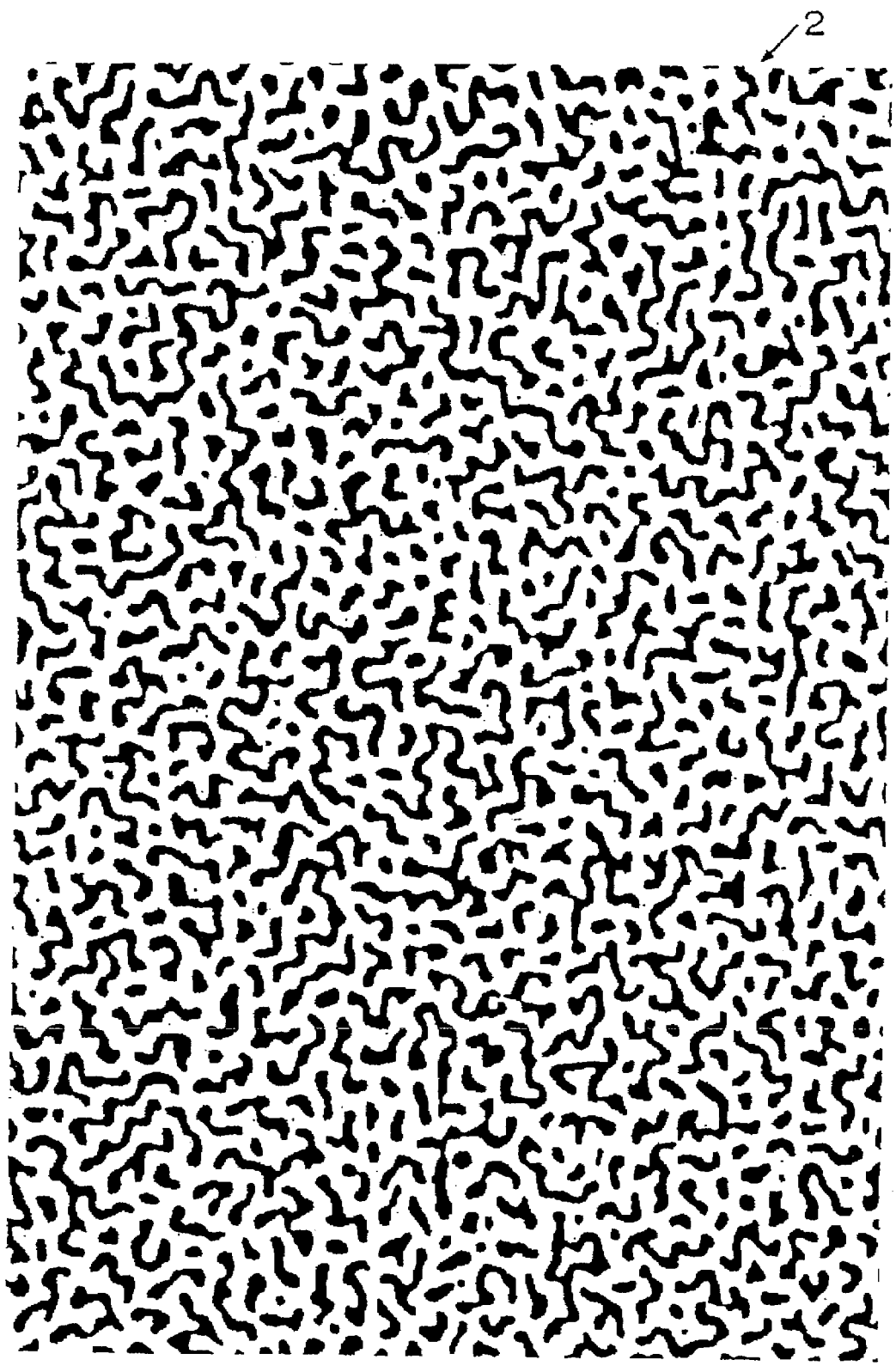
FIG. 2 is a magnified plane view of a plate pattern of a gravure plate at the time of relief printing of a luster adjusting resin layer.

In plane view of FIG. 2, a plane view shape of one example of the convex patterns 2 is shown. The convex pattern, as shown in FIG. 2, is a pattern composed of a large number of winding lines. FIG. 2 shows the patterns (printed parts are black parts) on a printing plate for forming the convex patterns by printing, and is a magnified drawing of an area of 5.25 cm length by 3.5 cm width (quadruple).

The plane view shape of the convex pattern is not particularly limited and may be formed depending on the uses. However, it is preferable to prevent a pattern, wherein the non-printed part is extremely wide as compared with the printed part that the printed parts are located in far apart to each other. That is because there is a limitation of the flow of the ink so that the non-printed parts may not be covered with the ink from the printed parts.

The plane view shape of the convex patterns may be a regular shape in addition to the random shape as exemplified in FIG. 2. For example, it may be corrugated shape, hair line shape and the like. The convex patterns in the plane view may be as lines, a continuous printed part which extends to the entire surface of the decorative sheet or the decorative plate, in addition to a plurality of respectively independent parts with limited area as exemplified in FIG. 2. They can be designed depending on the design expression.

The random shape is preferable from a viewpoint that the strength unevenness of the scratch resistance due to the convex pattern is not imparted, and that visually uneven impression is given to the convex patterns to result in visually even impression.

As described in the above, the convex pattern 2 is formed preferably by a printing method. As the printing method, foe example, known printing methods such as gravure printing and screen printing, by which ink can be applied thickly, may be employed properly. Above all, the gravure printing is preferable since a decorative sheet can easily and continuously be produced as a continuous belt-like product.

The specific size of the convex patterns may depend on the required scratch resistance and the convex-concave design expression. Generally, the height of the convex patterns (the height difference of the highest summit of the convex part and the lowest bottom of the concave part) is about 5 to 50 μm and the distance between the summits of the neighboring convex parts with a concave part in between may be about 0.2 to 2 mm, to obtain good scratch resistance.

To cover the non-printed parts by flowed ink, it is preferable to adjust the area ratio of the printed parts and the non-printed parts, in addition to the adjustment of the fluidity of the ink. To do so, the width (or the area) of the pattern of the drawing part (printed part) in the printing plate for forming the convex pattern by printing may be varied by adjusting printing plate manufacturing conditions. When the printed part is relatively narrow and pattern density is low, so that the non-printed part is difficult to be covered, the pattern density should be increased so as to make the non-printed parts easy to be covered.

When the non-printed parts are covered with the flowed ink, the permeability of the ink in the printed surface may affect in some cases. For example, when the base material is a penetrable base material such as paper and the ink-permeability of the printed surface is high, a part of the ink may be penetrated into the printed surface, resulting in insufficient flow of the ink to the non-printed parts. In such a case, to suppress the ink-permeability in the printed surface, it is effective to use impregnated paper with decreased penetrability by previous impregnation with resin. Alternatively, when penetrable paper is used as it is for the base material sheet, it is also effective to form a sealer layer by resin coating.

As the cross-link curing resin for forming the convex patterns 2, curing resins, such as ionizing radiation curing resin and thermosetting resin, which can be cured by cross-linking may be used. By forming the convex pattern using a cross-linked cured materials obtained by cross-linking and curing such curing resins gives excellent scratch resistance. Among them, the ionizing radiation curing resin is preferable since the scratch resistance and contamination resistance can reliably be improved.

As the specific ionizing radiation curing resin, compositions obtained by properly mixing prepolymers (including so-called oligomers) and/or monomers having radical polymerizable unsaturated bonds or cationic polymerizable functional groups in the molecular, which is able to cross-link and cure by ionizing radiation, are preferably used. The ionizing radiation curing resin and the ionizing radiation to be irradiated in the present invention are the same as explained in the paragraph of the luster adjusting resin layer in "1. Decorative material". Therefore, the explanation is not repeated here.

As the thermoplastic resin, two-component type urethane resin, melamine resin, epoxy resin, unsaturated polyester resin and the like may be used.

The two-component type urethane resin is urethane resins containing polyols as main components and isocyanates as cross-linking agents (curing agents). The polyol components are those having two or more hydroxyl groups in a molecule. For example as commonly used polyols, polyethylene glycol, polypropylene glycol, acryl polyols, polyester polyol, polyether polyol, polycarbonate polyol, polyurethane polyol and the like are used. On the other hand, as the isocyanate components, polyisocyanates having two or more isocyanato groups in a molecule are used. Examples of the polyisocyanates to be used are: aromatic isocyanates such as 2,4-tolylene diisocyanate, xylene diisocyanate, naphthalene diisocyanate, and 4,4'-diphenylmethane diisocyanate; or aliphatic (or alicyclic) isocyanates such as 1,6-hexamethylene diisocyanate, isophorone diisocyanate, hydrogen added tolylene diisocyanate, and hydrogen added diphenylmethane diisocyanate. Further, adducts or multimers of the above various isocyanates may be used. Tolylene diisocyanate adducts and tolylene diisocyanate trimer can be exemplified.

Additionally, with respect to the above isocyanates, aliphatic (or alicyclic) isocyanates are preferable in terms of the weathering resistance and resistance to yellowing by heat can be improved. For more specific examples, hexamethylene diisocyanate can be mentioned.

The above-mentioned cross-link curing resin may be mixed with a variety of additives as necessity. Examples of these additives are: a delustering agent such as silica, alumina, calcium carbonate and barium sulfate; a lubricant such as silicone and a wax; and a coloring agent such as a dye and a pigment.

The convex pattern may be transparent, semi-transparent, opaque, colored or colorless depending on the uses.

To improve the scratch resistance by the convex pattern, it is preferable that the ionizing radiation curing resin of the convex pattern further contains aluminum hydroxide as the filler. The aluminum hydroxide particles which is harder than the resin further improve the scratch resistance.

In the case of adding a delustering agent such as the delustering silica to adjust the luster, when the convex pattern is formed by gravure printing using a doctor blade and a gravure plate, to suppress the doctor streak generation, it is preferable to: add either magnesium hydroxide or magnesium carbonate as the filler; use silica, whose surface is treated with a fatty acid based wax, as the delustering silica; or use them in combination. Especially, it is more effective when the ionizing radiation curing resin is used for the cross-link curing resin, particularly in the case of using the resin without a solvent.

In addition to the addition of the delustering silica, by adding specific filler such as magnesium hydroxide, occurrence of the doctor streak at the time of gravure printing is improved, although the delustering silica is added.

In this case, as the delustering silica, conventionally known silica for delustering may be used properly depending on the uses. The doctor streaks are more lessened if the delustering silica particle diameter is small. However the delustering effect is also more decreased. On the other hand, the delustering effect is more increased if the thickness of the luster adjusting resin layer is thinner, for even the same particle diameter. Accordingly, the particle diameter of the delustering silica may be selected properly in consideration of the needed thickness of the convex patterns and the required delustering degree.

For example, when the thickness of the convex patterns is 10 to 15 µm, in order to obtain the delustering effect, it is preferable to select delustering silica with an average particle diameter of 8 µm or larger. On the other hand, the maximum of the average particle diameter is about 15 µm, in consideration of the doctor streak formation and the delustering effect. Consequently, in general, the particle diameter of the delustering silica is preferably about 8 to 15 µm. If it is smaller than the above range, sufficient delustering effect is not obtained, and if it is larger than the range, doctor streaks are easily formed (even if magnesium hydroxide or the like is used in combination with the delustering silica, or the delustering silica whose surface is treated with fatty acid based wax is used).

The doctor streaks are less likely to be formed as the adding amount of the delustering silica is smaller. However the delustering effect is also deteriorated. Therefore, in general, the adding amount is about 5 to 20 parts by mass, more preferably 10 to 20 parts by mass, to 100 parts by mass of the resin component. If it is less than the above range, sufficient delustering effect cannot be obtained, and if it exceeds the range, doctor streaks are easily formed (even if magnesium hydroxide or the like is used in combination with the delustering silica, or the delustering silica whose surface is treated with fatty acid based wax is used).

Magnesium hydroxide to be added as the filler, in combination with the delustering silica, has a refractive index close to that of a resin, imparts the transparency to the resin layer of the convex patterns, and also, gives good doctor streak improving effect among various fillers having soft hardness (Morse hardness 4 or 3 or lower) to the doctor blade. For example, doctor streak improving effect is also observed with the aluminum hydroxide having hardness similar to Morse hardness 3. On the other hand, with talc as softer as Morse hardness 1, doctor streak improving effect could not be obtained.

Similarly to magnesium hydroxide, magnesium carbonate, which is a magnesium compound as magnesium hydroxide, can provide transparency and can give good doctor streak improving effect, among various fillers having soft hardness (Morse hardness 4 or 3 or lower) to the doctor blade. However, there is a characteristic that the contamination resistance of the resin layer itself of the convex pattern is deteriorated. Accordingly, when the contamination resistance of the convex pattern is required, magnesium hydroxide is more preferable. When the contamination resistance of the convex pattern is not so much required, magnesium carbonate may be used.

Although the particle shape of magnesium hydroxide (similar in the case of magnesium carbonate) subjected to evaluating tests was amorphous, and thus, the shape was not spherical as described above (Japanese Patent Application Laid-Open No. 11-277685), the doctor streak improving effect was obtained.

The adding amount of specific filler such as magnesium hydroxide is properly adjusted depending on the ink physical property and the delustering degree. The adding amount is preferably 1 to 15 parts by mass, more preferably 1 to 10 parts by mass, to 100 parts by mass of the resin component. If it is less than the above range, sufficient improving effect cannot be obtained, and if it exceeds the above range, the doctor streak improving effect is deteriorated. Additionally, the delustering effect of magnesium hydroxide or the like itself (as compared with the delustering silica) is low. If magnesium hydroxide is added in a high content so as to obtain the delustering effect only by magnesium hydroxide all alone without the delustering silica, for example 40 parts by mass of magnesium hydroxide is added, the doctor streaks are worsened adversely more than those in the case of using the delustering silica alone.

The particle diameter of the above magnesium hydroxide is preferably to be 10 µm or less as the average particle diameter, at maximum, in terms of the doctor streak improvement.

Also, by using the silica, whose surface is treated with a fatty acid based wax, as the delustering silica, the doctor streak generation suppression effect is improved although the delustering silica is added. As the fatty acid based wax, for example, lauric acid, myristic acid, palmitic acid, stearic acid, behenic acid and the like may be used.

As described above, when the convex patterns are formed, using the ionizing radiation curing resin containing a delustering agent such as the delustering silica, by the gravure printing method using a doctor blade and a gravure plate, occurrence of the doctor streaks, which are generated easily due to the use of delustering silica, is improved by: using either one of magnesium hydroxide and magnesium carbonate in combination with the delustering silica; using the silica, whose surface is treated with a fatty acid based wax, as the delustering silica; or using them in combination. Although the effect can be obtained by using a conventional doctor blade made of a steel, as the doctor blade, a ceramic doctor is preferable in terms of the durability and less doctor streak formation.

[Base Material Sheet]

As the base material sheet, for example, paper, a nonwoven fabric, a thermosetting resin sheet, or their laminate may be used.

As the paper, for example, thin sheet paper, kraft paper, woodfree paper, linter paper, baryta paper, sulfuric acid paper, and Japanese paper (Washi) may be used.

As the nonwoven fabric, for example, nonwoven fabrics made of fibers of polyester resin, acrylic resin, nylon, vinylon and glass may be used. The basic weight of the paper and the nonwoven fabric is generally about 20 to 100 g/m². The paper and the nonwoven fabric may further be mixed with a resin such as acrylic resin, styrene-butadiene rubber, melamine resin, and urethane resin (by resin impregnation after production or intercalation at the time of production) in order to: reinforce the strength among fibers and interlayer strength to other layers; prevent fluffing; or penetrability suppression. Impregnated sheet is an example.

The decorative sheet using paper (or the nonwoven fabric) for the base material sheet becomes decorative paper.

As the thermoplastic resin sheet, acrylic resin, polyester resin, polyolefin based resin, polyvinylchloride resin, polystyrene, ABS resin, polycarbonate resin, polyamide and the like may be used.

Practical examples are as follows: (1) Polyolefin based resins such as polyethylene (high density, middle density, or low density), polypropylene (isotactic type or syndiotactic type), polybutene, ethylene-propylene copolymer, ethylene-propylene-butene copolymer, olefin based thermoplastic elastomer and the like. The above-mentioned olefin based thermoplastic elastomer is composed by mixing: hard segments of the crystalline polyolefin resins as exemplified above; and soft segments formed of elastomers such as ethylene-propylene rubber, ethylene-propylene-diene rubber, atactic polypropylene, styrene-butadiene rubber, hydrogen added styrene-butadiene rubber and the like. The mixing ratio of the hard segments and the soft segments [soft segment/hard segment] is about 5/95 to 40/60 (ratio by weight). Based on the necessity, the elastomer components may be cross-linked by known cross-linking agent such as sulfur and hydrogen peroxide.

(2) Acrylic resins such as polymethyl (meth)acrylate, polybutyl(meth)acrylate, methyl (meth)acrylate-butyl (meth) acrylate copolymer, methyl (meth)acrylate-styrene copolymer and the like [(meth)acrylate means acrylate or methacrylate]

(3) Polyester resins such as polyethylene terephthalate, polybutylene terephthalate, ethylene-terephthalate-isophthalate copolymer, polyethylene naphthalate, polyester based thermoplastic elastomer, non-crystalline polyester and the like. As the above polyester based thermoplastic elastomer, block polymers and the like using: aromatic polyester, with high crystallinity and a high melting point, as a hard segment; and non-crystalline polyether and the like, having a glass transition temperature −70° C. or lower, as a soft segment can be exemplified. As the polyester with high crystallinity and a high melting point, for example, polyethylene terephthlate may be used. As the non-crystalline polyether, polytetramethylene glycol and the like may be used. A typical example of the non-crystalline polyether is ethylene glycol-1,4-cyclohexanedimethanol-terephthalic acid copolymer.

(4) Other resins such as polycarbonate, polyvinyl chloride resin, polyamide resin, polyphenylene sulfide, and polyether ether ketone and the like can be listed.

The layer configuration of the base material sheet may include a single layer structure of the above paper, nonwoven fabric, thermoplastic resin sheet and the like, or a laminated of two or more layers of different type materials. The thickness of the base material sheet (the total thickness in the case of the laminate) is generally about 25 to 500 μm.

In terms of preventing the grain depression, paper, nonwoven fabric and the like are particularly effective.

[Decorative Layer]

By providing the decorative layer 3, a decorative sheet with good designing property can be obtained by expressing drawings and patterns on the layer. In this case, the decorative layer is preferably beneath the convex pattern, in terms of the durability of the decorative layer such as abrasion resistance to the decorative layer, scratch resistance, and contamination resistance. The decorative layer is more preferably formed in between the base material sheet and the convex pattern.

The decorative layer to be employed in the decorative sheet of the present invention may be made the same layer as the decorative layer explained in "A. Decorative material". Therefore, further explanation is not repeated here.

[Other Layers]

In the decorative sheet, layers other than the base material sheet, the convex patterns, and the decorative layer may be formed based on necessity. For example, the layer may be a sealer layer when the base material sheet is made of paper and the penetrability is inconvenient for ink flow at the time of convex pattern formation. Or the layer may be a primer layer when reinforcement of the adhesion between layers is required. The sealer layer and the primer layer may be formed with conventionally known materials by conventionally known methods in the decorative sheet. For example, the layers may be formed using an ink or a paint of resins such as acrylic resin and urethane resin by a printing method such as gravure printing or a coating method such as roll coating.

[Adhered Base Material]

A decorative plate D of the present invention (refer to FIG. 3B) is obtained by laminating the decorative sheet S of the present invention, of the above configuration, on the adhered base material 5 so as the base material sheet side faces the adhered base material 5 side. When the decorative sheet S and the adhered base material 5 themselves doe not have adhesive property, an adhesive may be used to form a laminate having an adhesive layer 4 in between them.

The adhered base material 5 is not particularly limited if it has a shape to which the decorative sheet can be laminated. Examples of the materials of the adhered base material are inorganic non-metal based, metal based, wood based, and plastic based and the like. More particularly, as the inorganic non-metal based materials, for example, inorganic materials: e.g. non-pottery ceramic industry based materials such as produced cement, extrusion cement, slag cement, ALC (autoclaved lightweight concrete), GRC (glass fiber-reinforced concrete), pulp cement, wood cement, asbestos cement, calcium silicate, gypsum, and gypsum slag; and ceramic type materials such as pottery, earthenware, whiteware, stoneware, glass, enamel and the like. The metal based includes, for example, metal materials such as iron, aluminum, copper and the like. The wood based includes, for example, veneers, laminates, particle boards, fiber boards, glued lamination boards of Japanese cedar, Japanese cypress, oak, lauan, teak and the like. The plastic based includes, for example, resin materials such as polypropylene, ABS resin, phenol resin and the like.

The shape of the adhered base material may be optional such as a flat plate, a curved plate, polygonal pole or the like.

The adhesive to be used for adhering the decorative sheet and the adhered base material is not particularly limited. Based on the materials, uses, and required physical properties of the adhered base material, a proper adhesive may be selected among conventionally known adhesives. For example, as the adhesive: thermoplastic resins such as polyamide resin, acrylic resin, vinyl acetate resin and the like; and curing resins such as thermosetting urethane resin and the like may be used. The adhesive may be applied by a known method such as roll coating. The adhesive is applied to the adhered base material, the decorative sheet, or both of them, and then, the decorative sheet is adhered to and laminated on the adhered base material.

[Uses]

The decorative sheet of the present invention and the decorative plate, obtained by laminating the same on the adhered base material, may be used for various purposes without any particular limitations. For example, they may be used as: interior materials for constructions such as walls, ceilings and the like; surface materials of fixtures such as doors, door flames, window flames and the like; surface materials of structural members such as corridors, baseboards and the like; and surface materials of furniture such as drawers, cabinets, desks, tables and the like.

EXAMPLES

The present invention will be further explained in detail by the following examples and comparative examples. A word "parts" in the following text and tables means "parts by mass".

Example 1

First, by using a coloring ink using a nitrocellulose based resin as a binder resin, a decorative layer, which is also used as a screening layer, was formed on a base material, formed of a resin impregnated paper of basic weight of 50 g/m², in a solid gray pattern for the entire surface by a gravure printing.

Next, by using a non-solvent ink formed of the below mentioned ionizing radiation curing resin composition, a predetermined decorative material was obtained as follows. After the gravure printing (relief printing) using a ceramic doctor and a gravure plate with a pattern as shown in a plane view in FIG. 2 (magnification), a luster adjusting resin layer, formed with a cross-link curing resin obtained by curing the ink with ionizing radiation, was provided on the decorative layer forming side. The luster of the decorative material was delustered by the luster adjusting resin layer, and a convex-concave surface design was imparted by the layer. Types of the luster adjusting resin layer and evaluation are shown in Table 1.

Ionizing Radiation Curing Resin Composition:

| epoxy acrylate prepolymer | 24 parts |
| diluted monomer (trimethylol propane triacrylate) | 76 parts |
| fine particle silica (average particle diameter 0.5 μm) | 0.5 parts |
| delustering silica (average particle diameter 8.7 μm) | 10 parts |
| (silica whose surface is treated with stearic acid based wax) | |

-continued

| aluminum hydroxide (average particle diameter 2.5 μm) | 5 parts |
| dispersant | 0.4 parts |
| lubricant (silicone based) | 1.2 parts |

Comparative Example 1

A decorative material was produced by the same manner as Example 1 except for an ionizing radiation curing resin composition containing delustering silica, whose surface is not treated, was used as the non-solvent ink for forming the luster adjusting resin layer in Example 1.

Ionizing Radiation Curing Resin Composition:

| epoxy acrylate prepolymer | 24 parts |
| diluted monomer (trimethylol propane triacrylate) | 76 parts |
| fine particle silica (average particle diameter 0.5 μm) | 0.5 parts |
| delustering silica (average particle diameter 8.7 μm) | 10 parts |
| (silica whose surface is not treated) | |
| aluminum hydroxide (average particle diameter 2.5 μm) | 5 parts |
| dispersant | 0.4 parts |
| lubricant (silicone based) | 1.2 parts |

[Performance Evaluation]

An occurrence of the doctor streak was evaluated by visual observation. Ones with no streaks were evaluated as good (○), ones with a few streaks that are within the limitation were evaluated as rather good (□), and ones with many streak that are out of the limitation were evaluated as no good (x). The surface luster of 60 degrees was measured with a grossmeter.

TABLE 1

Results of Performance Evaluation

| | Example 1 | Comparative Example 1 |
| --- | --- | --- |
| Surface treatment of delustering silica | Treated (treated with stearic acid based wax) | Not treated |
| Doctor streak | ○ to Δ | Δ to X |
| Gross (60 degrees) | 59 | 58 |

○: good,
□: inferior performance but within a limitation,
X: no good

The result of the Example 1 using fatty acid based wax treated delustering silica, as shown in Table 1, the level concerning the doctor streak was good to rather good (○ to Δ). In contrast, in Comparative Example 1 using normal delustering silica, whose surface is not treated, the level of the doctor streak was rather good to no good (Δ to x), which is inferior to Example 1.

Example 2

First, by using a coloring ink using a nitrocellulose based resin as a binder resin, a decorative layer 3, which is also used as a screening layer, was formed on a base material 1, formed of a resin impregnated paper of basic weight of 50 g/m², in a solid gray pattern for the entire surface by a gravure printing.

Next, by using a non-solvent ink formed of the below mentioned ionizing radiation curing resin composition containing amorphous magnesium hyroxide, a predetermined decorative material 10 was obtained as follows. After the gravure printing (relief printing) using a ceramic doctor and a gravure plate with a pattern as shown in a plane view in FIG.

2 (magnification), a luster adjusting resin layer 2, formed with a cross-link curing resin obtained by curing the ink with ionizing radiation, was provided on the decorative layer forming side. The luster of the decorative material was delustered by the luster adjusting resin layer, and a convex-concave surface design was imparted by the layer. Types of the luster adjusting resin layer and evaluation are shown in Table 2.

Ionizing Radiation Curing Resin Composition:

| | |
|---|---|
| epoxy acrylate prepolymer | 24 parts |
| diluted monomer (trimethylol propane triacrylate) | 76 parts |
| fine particle silica (average particle diameter 0.5 μm) | 0.5 parts |
| delustering silica (average particle diameter 8.5 μm) | 10.5 parts |
| magnesium hydroxide (average particle diameter 3.0 μm) | 10 parts |
| dispersant | 0.4 parts |
| lubricant (silicone based) | 1.2 parts |

Example 3

A decorative material was produced by the same manner as Example 2 except for that the below mentioned ionizing radiation curing resin composition containing amorphous magnesium carbonate instead of magnesium hydroxide was used as the non-solvent ink for forming the luster adjusting resin layer in Example 2.

Ionizing Radiation Curing Resin Composition:

| | |
|---|---|
| epoxy acrylate prepolymer | 24 parts |
| diluted monomer (trimethylol propane triacrylate) | 76 parts |
| fine particle silica (average particle diameter 0.5 μm) | 0.5 parts |
| delustering silica (average particle diameter 8.5 μm) | 10.5 parts |
| magnesium carbonate (average particle diameter 8 μm) | 10 parts |
| dispersant | 0.4 parts |
| lubricant (silicone based) | 1.2 parts |

Example 4

A decorative material was produced by the same manner as Example 2 except for that the content of magnesium hydroxide, as an ionizing radiation curing resin composition for forming the luster adjusting resin layer in Example 2, was increased to 15 parts.

Comparative Example 2

A decorative material was produced by the same manner as Example 2 except for that the below mentioned ionizing radiation curing resin composition containing 5 parts of amorphous aluminum hydroxide with average particle diameter of 2.5 μm instead of magnesium hydroxide was used as the non-solvent ink for forming the luster adjusting resin layer in Example 2.

Ionizing Radiation Curing Resin Composition:

| | |
|---|---|
| epoxy acrylate prepolymer | 24 parts |
| diluted monomer (trimethylol propane triacrylate) | 76 parts |
| fine particle silica (average particle diameter 0.5 μm) | 0.5 parts |
| delustering silica (average particle diameter 12 μm) | 16 parts |
| magnesium carbonate (average particle diameter 8 μm) | 10 parts |
| dispersant | 0.4 parts |
| lubricant (silicone base) | 1.2 parts |

Comparative Example 3

A decorative material was produced by the same manner as Example 2 except for that a composition containing 10 parts of plate-shaped talc with average particle diameter of 2 μm was used instead of magnesium hydroxide as the ionizing radiation curing resin composition for forming the luster adjusting resin layer in Example 2.

Comparative Example 4

A decorative material was produced by the same manner as Example 2 except for that a composition containing 10 parts of amorphous kaolin clay with average particle diameter of 9 μm was used instead of magnesium hydroxide as the ionizing radiation curing resin composition for forming the luster adjusting resin layer in Example 2.

Comparative Example 5

A decorative material was produced by the same manner as Example 2 except for that the delustering silica is not contained as the ionizing radiation curing resin composition for forming the luster adjusting resin layer in Example 2. And instead of the above, the content of the magnesium hydroxide was increased to 40 parts.

Reference Example 1

A decorative material was produced by the same manner as Example 2 except for that the content of the magnesium hydroxide was increased to 20 parts, as the ionizing radiation curing resin composition for forming the luster adjusting resin layer in Example 2.

[Performance Evaluation]

An occurrence of the doctor streak was evaluated by visual observation. For coloring contamination resistance, after polluting a surface according to JAS contamination A test, the surface was cleaned with methyl alcohol, and coloring condition of the surface was evaluated by a visual observation.

For the doctor streaks, ones with no streaks were evaluated as good (○), ones with a few streaks that are within the limitation were evaluated as rather good (□), and ones with many streak that are out of the limitation were evaluated as no good (x).

For the coloring contamination resistance, ones with no contamination on the luster adjusting resin layer were evaluated as good, ones with a few contamination that are within the limitation were evaluated as rather good (□), and ones with heavy contamination that are out of the limitation were evaluated as no good (x).

Moreover, the surface luster of 60 degrees was measured with a grossmeter.

TABLE 2

Results of Performance Evaluation

| | | Example 2 | Example 3 | Example 4 | Comparative Example 2 | Comparative Example 3 | Comparative Example 4 | Comparative Example 5 | Reference Example 1 |
|---|---|---|---|---|---|---|---|---|---|
| Delustering silica | Ave. Dia. (μm) | 8.5 | 8.5 | 8.5 | 12 | 8.5 | 8.5 | — | 8.5 |
| | Content (parts) | 10.5 | 10.5 | 10.5 | 16 | 10.5 | 10.5 | 0 | 10.5 |
| Filler | Type | Mg hydroxide | Mg hydroxide | Mg hydroxide | Al hydroxide | Talc | Kaolin | Mg hydroxide | Mg hydroxide |
| | Ave. Dia. (μm) | 2.5 | 8 | 2.5 | 2.5 | 2 | 9 | 2.5 | 2.5 |
| | Content (parts) | 10 | 10 | 15 | 5 | 10 | 10 | 40 | 20 |
| Doctor streak | | ○ | ○ | Δ | ○ | Δ to X | Δ to X | X | Δ to X |
| Coloring contamination resistance | | Δ | X | Δ | Δ | Δ | Δ | Δ | Δ |
| Gross (60 degrees) | | 44 | 37 | 37 | 41 | 30 | 35 | 38 | 28 |

○: good,
Δ: inferior performance but within a limitation,
X: no good

The result in all of the Examples, as shown in Table 2, concerning the doctor streaks was good (○) or higher than rather good (Δ). However, the coloring contamination resistance in Example 2, which uses magnesium carbonate, was heavy so that it was evaluated as no good. In contrast, the doctor streaks in each Comparative Example was evaluated to be the level of rather good to no good (Δ to x). Moreover, results for Reference Example 1, in which the content of the magnesium hydroxide was increased to 20 parts, was as same as these Comparative Examples.

Example 5

First, by using a coloring ink using a nitrocellulose based resin as a binder resin, a decorative layer 3, which is also used as a screening layer, was formed on a base material sheet 1, formed of a resin impregnated paper of basic weight of 50 g/m², in a solid gray pattern for the entire surface by overprinting two times of gravure printing.

Next, with an ink A formed of a cross-link curing resin of the below mentioned composition, one-color gravure printing was carried out by using a printing plate with a pattern as shown in a plane view in FIG. 2 (magnification). The ink of printing parts was flowed to coat non-printing parts so as to form a single layer of convex pattern with continuous convex parts and concave parts. Transferred amount of the ink was 10 g/m² based on a solid part of the coated amount. Moreover, ceramic doctor was used as the doctor for the gravure printing.

Ink A:

| | |
|---|---|
| epoxy acrylate oligomer | 24 parts by mass |
| diluted monomer (trimethylol propane triacrylate) | 76 parts by mass |
| fine particle silica (average particle diameter 16 nm) | 0.5 parts by mass |
| delustering silica (average particle diameter 11 μm) | 16 parts by mass |
| body pigment (aluminum hydroxide, average particle diameter 1.3 μm) | 5 parts by mass |
| lubricant (silicone acrylate) | 1.2 parts by mass |

And then, a predetermined decorative sheet S as shown in FIG. 3A was obtained by forming a convex pattern 2 by cross-link curing the cross-link curing resin by irradiating the ionizing radiation with an ionizing radiation irradiating device under condition of 175 keV accelerating energy and 50 kGy exposing dose.

Moreover, a difference of elevation of the convex pattern was 10 μm for the minimum part, and 40 μm for the maximum part. Further, convex interval of the convex pattern was 0.5 to 2 mm.

Next, using the above obtained decorative sheet, a decorative material D as shown in FIG. 3B was produced. For an adhered base material 5, a lauan plywood of 3 mm thickness was used. Vinyl acetate resin based emulsion type adhesive, to be an adhesive layer 4, was coated on this adhered base material. And on this, the decorative sheet S was laminated, so that its base material sheet 1 side faces the adhesive layer side, thus obtaining a predetermined decorative material D.

Comparative Example 6

A decorative sheet was produced by the same manner as Example 5 except for that an ink B of the below mentioned composition was used instead of the ink A used for forming the convex pattern in Example 5. Moreover, transferred amount of the ink, when printing the convex pattern, was 10 g/m² based on a solid part of the coated amount. Further, a decorative material was produced, by using this decorative sheet, by the same manner as Example 5. However, upon the production of the decorative sheet, it seemed that the ink flow of the printing parts, when printing the convex pattern, was not sufficient.

Ink B:

| | |
|---|---|
| epoxy acrylate oligomer | 24 parts by mass |
| diluted monomer (trimethylol propane triacrylate) | 76 parts by mass |
| fine particle silica (average particle diameter 16 nm) | 0.5 parts by mass |
| delustering silica (average particle diameter 7 μm) | 10 parts by mass |
| body pigment (aluminum hydroxide, average particle diameter 1.3 μm) | 5 parts by mass |
| lubricant (silicone acrylate) | 1.2 parts by mass |

[Performance Evaluation]

The decorative materials produced in Example 5 and in Comparative Example 6 were evaluated for scratch resistance, grain depression and contamination resistance. Moreover, ink coating conditions of the concave parts was observed. Each evaluation was carried out as follows. The results are shown in Table 3.

(1) Scratch resistance: The decorative materials were evaluated by scratch resistance test using Hoffmann testing machine (good when the load is 2N or more), marling resistance test (the tip was changed to a rounded tip in testing, good when the load is 2N or more) and steel wool test (good when there is no damage after 10 strokes of rubbing with No. 0 steel wool). The result was evaluated as good (○) when all the results in the above-mentioned test were good.

(2) Grain depression: By visually observing the surface, evaluated according to the presence and absence of the grain depression. The result was evaluated as good (○) when there is no grain depression.

(3) Coating condition of the concave parts: The surfaces were evaluated by observing with a microscope. The results were evaluated as good (○) when the concave parts are coated well with the ink, as rather good (Δ) when the concave parts are almost coated, and as no good (x) when the coating was not complete.

(4) Contamination resistance: Four hours after polluting the surface with each polluting material of black marking pen, red crayon and blue office ink, the surface was clean with a cloth immersed with a neutral detergent, and then, the polluted condition of the surface was evaluated by visual observation. The results were evaluated as good (○) when there is no pollution at all, as rather good (□) when there is a little pollution, as bad (x) when there is a pollution, and as very bad (xx) when there is a heavy pollution.

TABLE 3

Results of Performance Evaluation

| | Scratch resistance | Grain depression | Concave part coating condition | Contamination resistance | | |
|---|---|---|---|---|---|---|
| | | | | Black marking pen | Red crayon | Blue office ink |
| Example 5 | ○ | ○ | ○ | □ | ○ | ○ to □ |
| Comparative Example 6 | ○ | ○ | □ to x | xx | ○ | □ |

○: good,
Δ: rather good,
x: bad,
xx: very bad

The scratch resistance and grain depression in both of Example 5 and Comparative Example 6 were good, as shown in Table 3. However, in contrast of the coating condition of the concave parts, non-printing parts of the convex pattern, in Example 5 being good (○), it was bad (□ to x) in Comparative Example 6. Therefore, a significant difference in the contamination resistance occurred. That is, in contrast of the contamination resistance in Comparative Example 6, particularly for the black marking pen, being very bad (xx), the contamination resistance in Example 5 was rather good (□) or better for the each polluting material.

Example 6

First, as same as in Example 5, by using a coloring ink using a nitrocellulose based resin as a binder resin, a decorative layer 3, which is also used as a screening layer, was formed on a base material sheet 1, formed of a resin impregnated paper of basic weight of 50 g/m², in a solid gray pattern for the entire surface by overprinting two times of gravure printing.

Next, with a non-solvent ink C formed of a cross-link curing resin (ionizing radiation curing resin) of the below mentioned composition containing magnesium hydroxide together with delustering silica, one-color gravure printing was carried out by using a ceramic doctor and a printing plate with a pattern as shown in a plane view in FIG. 2 (magnification). The ink of printing parts was flowed to coat non-printing parts so as to form a single layer of convex pattern with continuous convex parts and concave parts. And then, a predetermined decorative sheet was obtained by forming a convex pattern 2 by curing the ink, with the ionizing radiation, to be a cross-linked cured material. Further, a decorative material was produced, using this decorative sheet, as in Example 5.

Ink C:

| | |
|---|---|
| epoxy acrylate prepolymer | 24 parts by mass |
| diluted monomer (trimethylol propane triacrylate) | 76 parts by mass |
| fine particle silica (average particle diameter 0.5 μm) | 0.5 parts by mass |
| delustering silica (average particle diameter 8.5 μm) | 10.5 parts by mass |
| magnesium hydroxide (average particle diameter 3.0 μm) | 10 parts by mass |
| dispersant | 0.4 parts |
| lubricant (silicone based) | 1.2 parts by mass |

Example 7

First, as same as in Example 5, by using a coloring ink using a nitrocellulose based resin as a binder resin, a decorative layer 3, which is also used as a screening layer, was formed on a base material sheet 1, formed of a resin impregnated paper of basic weight of 50 g/m², in a solid gray pattern for the entire surface by overprinting two times of gravure printing.

Next, with a non-solvent ink D formed of a cross-link curing resin (ionizing radiation curing resin) of the below mentioned composition containing surface treated delustering silica, one-color gravure printing was carried out by using a ceramic doctor and a printing plate with a pattern as shown in a plane view in FIG. 2 (magnification). The ink of printing parts was flowed to coat non-printing parts so as to form a single layer of convex pattern with continuous convex parts and concave parts. And then, a predetermined decorative sheet was obtained by forming a convex pattern 2 by curing the ink, with the ionizing radiation, to be a cross-linked cured material. Further, a decorative material was produced, using this decorative sheet, as in Example 5.

Ink D:

| | |
|---|---|
| epoxy acrylate prepolymer | 24 parts by mass |
| diluted monomer (trimethylol propane triacrylate) | 76 parts by mass |
| fine particle silica (average particle diameter 0.5 μm) | 0.5 parts by mass |
| delustering silica (average particle diameter 8.7 μm) (silica whose surface is treated with stearic acid based wax) | 10 parts |
| aluminum hydroxide (average particle diameter 2.5 μm) | 5 parts by mass |
| dispersant | 0.4 parts |
| lubricant (silicone based) | 1.2 parts by mass |

Example 8

First, as same as in Example 5, by using a coloring ink using a nitrocellulose based resin as a binder resin, a decorative layer 3, which is also used as a screening layer, was formed on a base material sheet 1, formed of a resin impregnated paper of basic weight of 50 g/m², in a solid gray pattern for the entire surface by overprinting two times of gravure printing.

Next, with a non-solvent ink E formed of a cross-link curing resin (ionizing radiation curing resin) of the below mentioned composition containing magnesium carbonate together with delustering silica, one-color gravure printing was carried out by using a ceramic doctor and a printing plate with a pattern as shown in a plane view in FIG. 2 (magnification). The ink of printing parts was flowed to coat non-printing parts so as to form a single layer of convex pattern with continuous convex parts and concave parts. And then, a predetermined decorative sheet was obtained by forming a convex pattern 2 by curing the ink, with the ionizing radiation, to be a cross-linked cured material. Further, a decorative material was produced, using this decorative sheet, as in Example 5.

Ink E:

| | |
|---|---|
| epoxy acrylate prepolymer | 24 parts by mass |
| diluted monomer (trimethylol propane triacrylate) | 76 parts by mass |
| fine particle silica (average particle diameter 0.5 μm) | 0.5 parts by mass |
| delustering silica (average particle diameter 8.5 μm) | 10.5 parts by mass |
| magnesium carbonate (average particle diameter 8 μm) | 10 parts by mass |
| dispersant | 0.4 parts |
| lubricant (silicone based) | 1.2 parts by mass |

Comparative Example 7

A decorative sheet and decorative material were produced in the same condition as Example 6 except for that, in the composition of the ink C in Example 6, 10 parts by mass of plate-shaped foil talc with average particle diameter of 2 μm was contained instead of 10 parts by mass of magnesium hydroxide.

[Performance Evaluation]

For Example 5, Example 6, Example 7 and Example 8, when printing the decorative sheet, with a rotogravure printing machine, using a long belt-shaped sheet (using by winding off of a reel) as a base material sheet, occurrence of the doctor streak was evaluated by visual observation. As the result, in all of the above-mentioned Examples, the doctor streaks did not occur even a total of 5000 m was printed, that the improvement effect was observed. On the other hand, in Comparative Example 7, the doctor streaks were observed by 1 hour of printing.

The invention claimed is:

1. A decorative material, wherein a luster adjusting resin layer, which is formed of a cross-linked cured material of an ionizing radiation curing resin composition containing a delustering silica, is provided on a base material, and
    the luster adjusting resin layer further contains either one or both of a magnesium hydroxide and a magnesium carbonate, as a filler,
    wherein a material of the base material is a paper based, wood based, or metal based material.

2. The decorative material according to claim 1, wherein the luster adjusting resin layer is formed partially, in a pattern, to form a convex-concave surface design of the luster adjusting resin layer.

3. The decorative material according to claim 1, wherein a contained amount of the delustering silica is within the range of 10 to 20 parts by mass to 100 parts by mass of the cross-linked cured material.

4. The decorative material according to claim 1, wherein the luster adjusting resin layer contains the magnesium hydroxide.

5. The decorative material according to claim 1, wherein a particle diameter of the delustering silica is within the range of 8 to 15 μm and a particle diameter of a magnesium compound is within the range of 2.5 to 10 μm.

6. A method for manufacturing, the decorative material according to claim 1, wherein the ionizing radiation curing resin composition is formed into the luster adjusting resin layer, with no solvent, by using a doctor blade and a gravure plate.

7. The method for manufacturing a decorative material according to claim 6, wherein an amount of the delustering silica contained in the ionizing radiation curing resin composition is in a range of 5 parts by mass to 20 parts by mass to 100 parts by mass of an ionizing radiation curing resin.

8. The method for manufacturing a decorative material according to claim 6, wherein the luster adjusting resin layer is formed in a pattern on the base material.

* * * * *